(12) United States Patent
Katayama

(10) Patent No.: US 11,806,869 B2
(45) Date of Patent: Nov. 7, 2023

(54) DRIVING FORCE TRANSMISSION DEVICE AND ROBOT HAND

(71) Applicant: KAMOSEIKO KABUSHIKI KAISHA, Toyota (JP)

(72) Inventor: Yoshitake Katayama, Toyota (JP)

(73) Assignee: KAMOSEIKO KABUSHIKI KAISHA, Toyota (JP)

( * ) Notice: Subject to any disclaimer, the term of this patent is extended or adjusted under 35 U.S.C. 154(b) by 7 days.

(21) Appl. No.: 17/639,542

(22) PCT Filed: Sep. 7, 2020

(86) PCT No.: PCT/JP2020/033807
§ 371 (c)(1),
(2) Date: Mar. 1, 2022

(87) PCT Pub. No.: WO2021/106305
PCT Pub. Date: Jun. 3, 2021

(65) Prior Publication Data
US 2022/0324097 A1 Oct. 13, 2022

(30) Foreign Application Priority Data

Nov. 29, 2019 (JP) ................................. 2019-216829
Apr. 22, 2020 (JP) ................................. 2020-075787

(51) Int. Cl.
*B25J 9/00* (2006.01)
*B25J 9/10* (2006.01)
(Continued)

(52) U.S. Cl.
CPC .............. *B25J 9/102* (2013.01); *B25J 15/00* (2013.01); *F16H 25/04* (2013.01)

(58) Field of Classification Search
CPC ... B25J 9/102; B25J 15/00; B25J 9/103; B25J 17/00; B25J 9/109; F16H 25/04; F16H 25/183; F16H 25/18; F16H 35/00
See application file for complete search history.

(56) References Cited

U.S. PATENT DOCUMENTS

2003/0154814 A1    8/2003 Irie et al.

FOREIGN PATENT DOCUMENTS

FR          1230646 A      9/1960
GB          2085994 A      5/1982
(Continued)

*Primary Examiner* — Victor L Macarthur
(74) *Attorney, Agent, or Firm* — Ken

(57) ABSTRACT

A driving force transmission device includes an input section and an output section with rotation axes nonparallel to each other to avoid backlash. A driving force transmission device (1) includes a first rotator (2), a second rotator (3), and spheres (5A, 5B, 5C). The first rotator (2) performs one of an input operation and an output operation of a driving force and includes a concave surface (7). The second rotator (3) performs the other of the input operation and the output operation of the driving force and includes a convex surface (13) fitted into the concave surface (7). The spheres (5A, 5B, 5C) are between the concave surface (7) and the convex surface (13). The concave surface (7) has holes (32A, 32B, 32C) in which the respective spheres (5A, 5B, 5C) are received. The convex (13) surface has a groove (29, 30) that receives parts of the spheres (5A, 5B, 5C) protruding from the holes (32A, 32B, 32C).

12 Claims, 22 Drawing Sheets

(51) Int. Cl.
*B25J 15/00* (2006.01)
*F16H 25/04* (2006.01)

(56) References Cited

FOREIGN PATENT DOCUMENTS

| | | | |
|---|---|---|---|
| JP | 40-031045 B | 11/1965 | |
| JP | 59-182083 A | 10/1984 | |
| JP | 2003278875 A * | 10/2003 | ............. F16H 13/04 |

* cited by examiner

VIII view

XI view

DRIVING FORCE TRANSMISSION DEVICE AND ROBOT HAND

FIELD

The present disclosure mainly relates to a driving force transmission device.

BACKGROUND

Driving force transmission devices including an input section and an output section with their rotation axes nonparallel to each other have been used in various fields. For example, such a driving force transmission device is incorporated in a robot hand to transmit a driving force generated by a driving force generator such as a motor to a driving target such as an arm.

A driving force transmission device including an input section and an output section with their rotation axes nonparallel to each other typically uses bevel gears that mesh with each other and thus can have a large amount of gear backlash (refer to, for example, Patent Literature 1).

For various processes using robot hands that involve highly accurate operations, such backlash in the driving force transmission devices is to be avoided.

CITATION LIST

Patent Literature

Patent Literature 1: Japanese Unexamined Patent Application Publication No. 59-182083

BRIEF SUMMARY

Technical Problem

One or more aspects of the present disclosure are directed to a driving force transmission device including an input section and an output section with rotation axes nonparallel to each other to avoid backlash.

Solution to Problem

A driving force transmission device according to one or more aspects of the present disclosure includes a first rotator, a second rotator, and a plurality of spheres. The first rotator performs one of an input operation and an output operation of a driving force and includes a concave surface. The second rotator performs the other of the input operation and the output operation of the driving force and includes a convex surface fitted into the concave surface. The plurality of spheres are between the concave surface and the convex surface. The concave surface has a plurality of holes in which the respective plurality of spheres are received. The convex surface has a groove that receives parts of the plurality of spheres protruding from the plurality of holes.

The groove includes at least one bend having a vertex and two sides extending in a portion of the second rotator located toward a first end of the second rotator in an axial direction of the second rotator.

In response to the first rotator or the second rotator being driven to rotate under an external driving force, the plurality of spheres received in the plurality of holes revolve about a rotation axis of the first rotator and move along the groove between the concave surface and the convex surface being out of contact with each other The plurality of holes and the groove are located to create a pressurized state throughout a rotation range of each of the first rotator and the second rotator. The pressurized state is a state in which at least one of the plurality of spheres has a pressure angle of 60° or less. The pressure angle is, at each position in the at least one bend, an angle between a direction normal to an outer opening edge of an opening edge of the at least one bend and the moving direction of each of the plurality of spheres.

The driving force transmission device according to the above aspects of the present disclosure avoids potential backlash.

DETAILED DESCRIPTION

Figure 1:
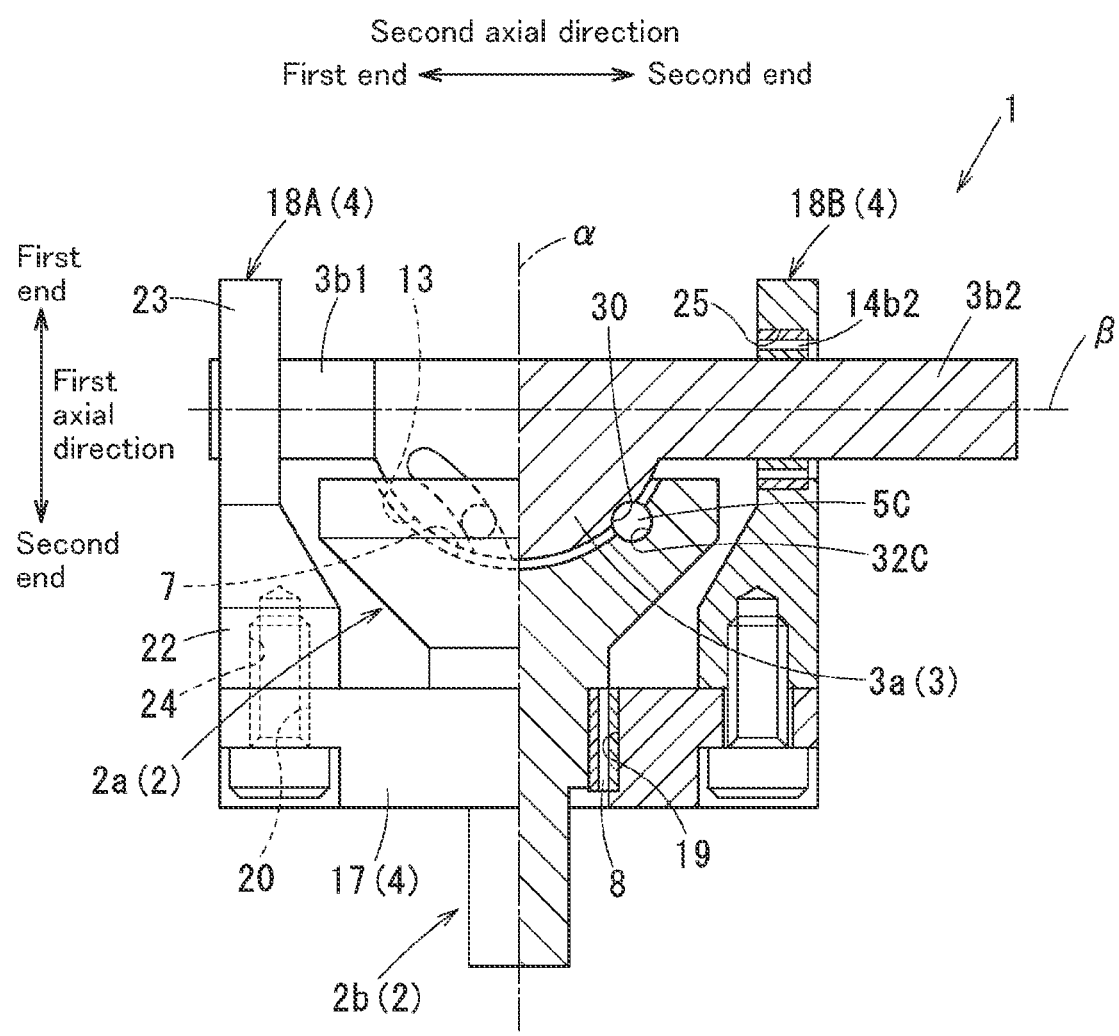
FIG. 1 is a front view of a driving force transmission device including a partial cross-section (first embodiment).
Figure 2:
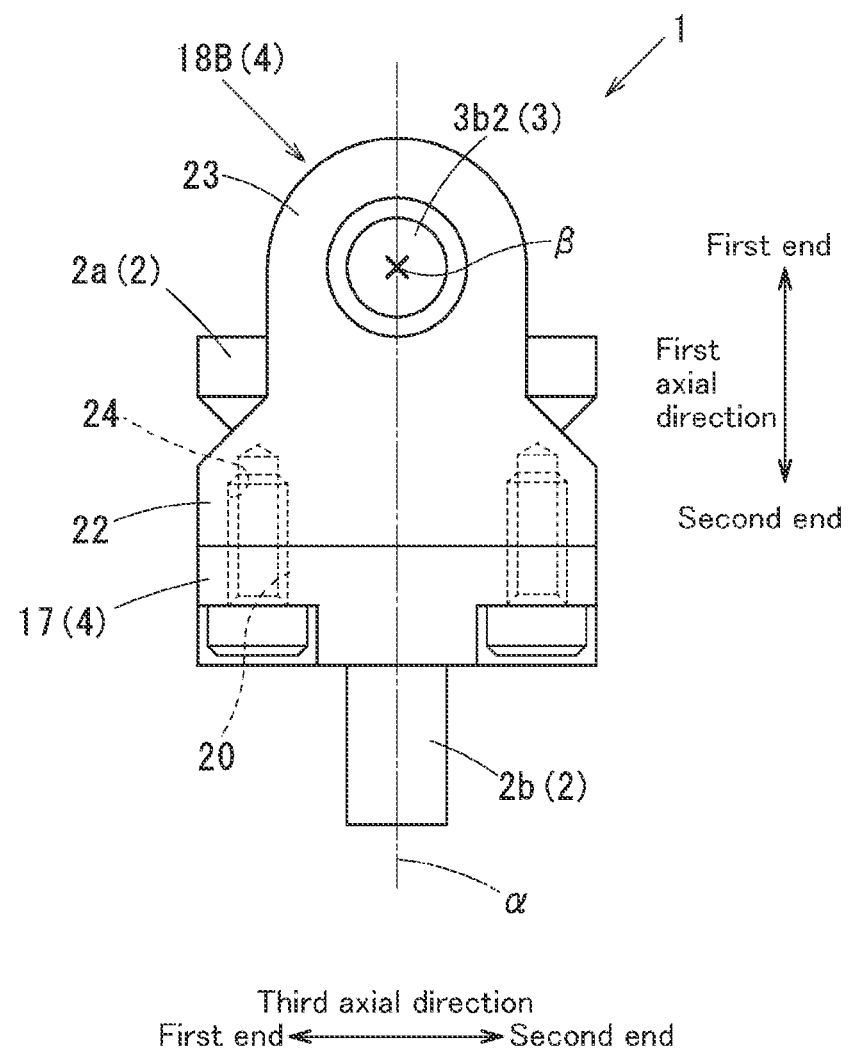
FIG. 2 is a side view of the driving force transmission device as viewed from its second end in a second axial direction (first embodiment).
Figure 3:
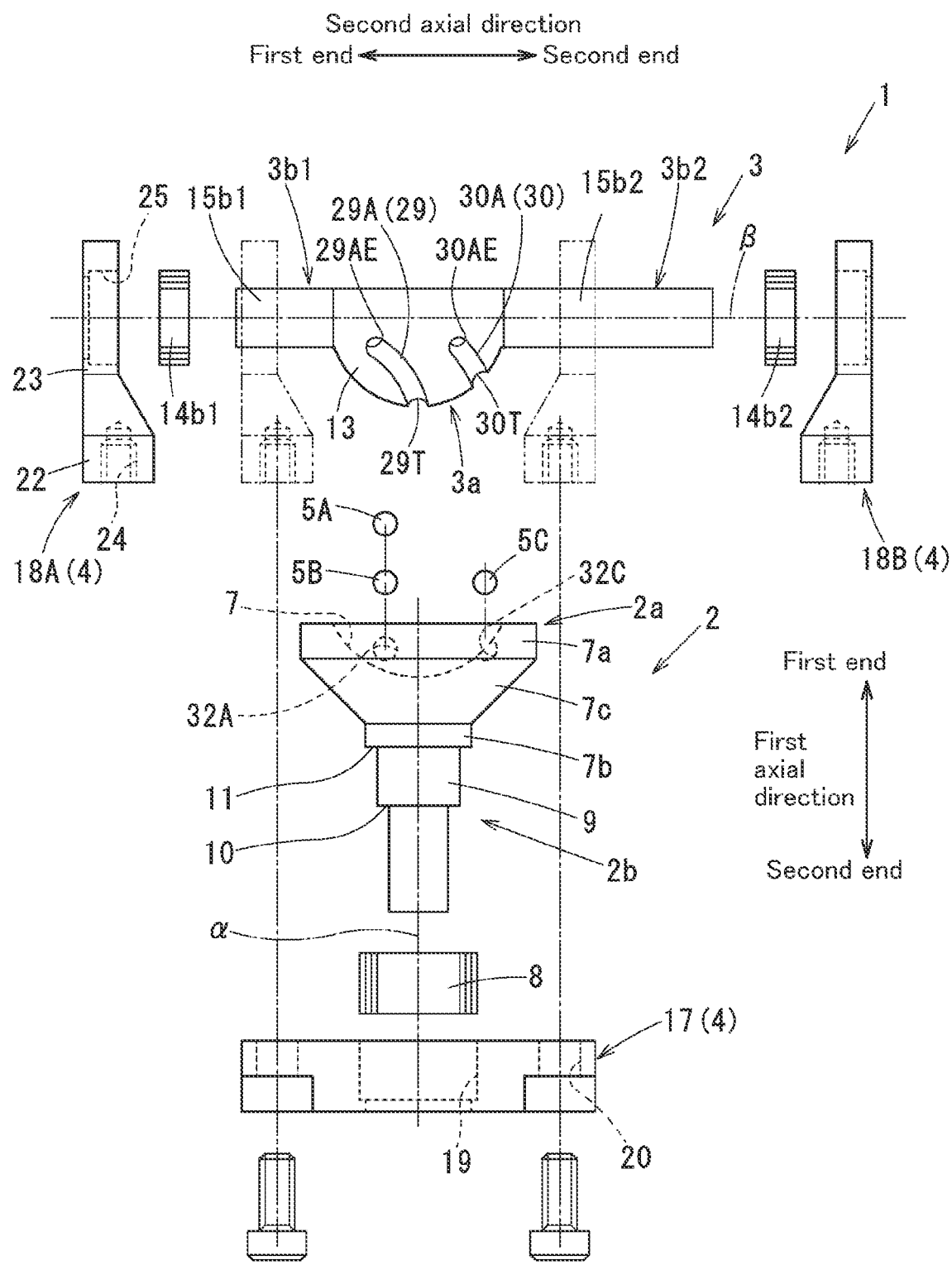
FIG. 3 is an exploded view of the driving force transmission device (first embodiment).

Embodiments of the present disclosure will now be described in detail with reference to the examples below.

EXAMPLES

Structure in First Embodiment

A driving force transmission device 1 according to a first embodiment will now be described with reference to, for example, FIGS. 1 to 12.

The driving force transmission device 1 is used in, for example, a robot hand to transmit a driving force generated by a driving force generator such as a motor to a driving target such as an arm.

The driving force transmission device 1 includes a first rotator 2, a second rotator 3, a support 4, and three spheres 5A, 5B, and 5C described below.

The first rotator 2 performs one of an input operation and an output operation of a driving force. The first rotator 2 is driven to rotate under a driving force. The first rotator 2 includes a first transmitter 2a and a rotational shaft 2b described below.

The first transmitter 2a receives a driving force from or outputs a driving force to the second rotator 3. The first transmitter 2a has a spherical concave surface 7 for transmitting a driving force. The concave surface 7 defines a space that is open at its first end in the direction of a rotation axis α of the first rotator 2 (hereafter, the direction of the rotation axis α may be referred to as a first axial direction).

The open space defined by the concave surface 7 is circular as viewed from the first end in the first axial direction. The concave surface 7 includes, on its outer circumference, a cylindrical surface 7a with a larger diameter at its first end in the first axial direction and a cylindrical surface 7b with a smaller diameter at its second end in the first axial direction, and has, between the cylindrical surface 7a and the cylindrical surface 7b, a cone surface 7c having a decreasing diameter toward its second end in the first axial direction (refer to FIG. 3).

The rotational shaft 2b extends from the first transmitter 2a toward its second end in the first axial direction. The rotational shaft 2b is connected to a component that is one of a driving force generator and a driving target. This structure forms a driving force input-output unit. The rotational shaft 2b includes a bearing receiver 9 that receives a bearing 8 in its first end in the first axial direction. Further, the rotational shaft 2b includes a portion with a smaller diameter than the bearing receiver 9 in its second end opposite to the bearing receiver 9 in the first axial direction. A step 10 is defined between the portion with the smaller diameter and the bearing receiver 9. A step 11 is defined between a second end of the first transmitter 2a in the first axial direction, or the cylindrical surface 7b, and the bearing receiver 9.

The second rotator 3 performs the other one of the input operation and the output operation of a driving force. The second rotator 3 is driven to rotate under a driving force. The second rotator 3 includes a second transmitter 3a and two rotational shafts 3b1 and 3b2 described below.

The second transmitter 3a receives a driving force from or outputs a driving force to the first rotator 2. The second transmitter 3a has a spherical convex surface 13 for transmitting a driving force. Further, the second rotator 3 is joined to have its rotation axis β perpendicular to the rotation axis α and the convex surface 13 fitted into the concave surface 7 (hereafter, the direction of the rotation axis β may be referred to as a second axial direction).

The rotational shaft 3b1 extends from the second transmitter 3a and has a first end in the second axial direction. The rotational shaft 3b1 includes a bearing receiver 15b1 to receive a bearing 14b1. The rotational shaft 3b2 extends from the second transmitter 3a and has a second end in the second axial direction. The rotational shaft 3b2 includes a bearing receiver 15b2 to receive a bearing 14b2. More specifically, the second rotator 3 is received by the bearing and supported on the first and second ends of the second transmitter 3a in the second axial direction. The rotational shaft 3b2 is longer than the rotational shaft 3b1.

Thus, for example, the bearing receiver 15b1 is located on a first end of the rotational shaft 3b1 in the second axial direction, and the bearing receiver 15b2 is located between a second end of the rotational shaft 3b2 in the second axial direction and the second transmitter 3a. In the second axial direction, the distance between the second transmitter 3a and the bearing receiver 15b1 and the distance between the second transmitter 3a and the bearing receiver 15b2 are equal to each other.

The portion of the rotational shaft 3b2 from the bearing receiver 15b2 to the second end in the second axial direction is connected to a component that is one of the driving force generator and the driving target. This structure forms the driving force input-output unit.

The rotational shafts 3b1 and 3b2 have the same diameter. The bearing receiver 15b1 has a slightly smaller diameter than the other portions of the rotational shaft 3b1. The bearing receiver 15b2 and the portion of the rotational shaft 3b2 from the bearing receiver 15b2 to the second end in the second axial direction have a slightly smaller diameter than the other portions of the rotational shaft 3b2.

The support 4 includes a base 17 and side portions 18A and 18B fastened to the base 17 with screws for supporting the first rotator 2 and the second rotator 3 in a rotatable manner.

The base 17 supports the first rotator 2 in a rotatable manner. The base 17 is, for example, a single thick rectangular plate and has a hole 19 extending through the center of the rectangle in the thickness direction. The base 17 has, in the four corners of the rectangle, threaded holes 20 for fastening with the side portions 18A and 18B with screws.

The hole 19 receives the first rotator 2 and the bearing 8 on the inner circumference. The bearing 8 is, for example, a ball bearing that sandwiches and holds balls between an inner ring and an outer ring. The outer ring is attached to the inner circumference of the hole 19 to be integral with the base 17. The inner ring is attached to the bearing receiver 9 to be integral with the first rotator 2.

The first transmitter 2a is placed on the first end of the base 17 in the first axial direction. The portion with the smaller diameter in the rotational shaft 2b protrudes from the second end of the base 17 in the first axial direction through the hole 19.

The side portions 18A and 18B support the second rotator 3 in a rotatable manner. The side portions 18A and 18B each include a fastening portion 22 for fastening with the base 17 and a body 23 for supporting the second rotator 3.

The fastening portion 22 in each of the side portions 18A and 18B has two threaded holes 24 apart from each other. The side portions 18A and 18B are joined to have these threaded holes 24 parallel to a third axial direction perpendicular to the first and second axial directions (refer to FIG. 2).

The body 23 is raised from the fastening portion 22. The body 23 is a plate parallel to the direction in which the threaded holes 24 are arranged. Further, the body 23 has a hole 25 extending through the body 23 in the thickness direction. The hole 25 in the side portion 18A receives the rotational shaft 3b1 and the bearing 14b1 on its inner circumference. The hole 25 in the side portion 18B receives the rotational shaft 3b2 and the bearing 14b2 on its inner circumference. The bearings 14b1 and 14b2 are ball bearings similar to the bearing 8. The outer ring of the bearing 14b1 is attached to the inner circumference of the hole 25 to be integral with the side portion 18A. The outer ring of the bearing 14b2 is attached to the inner circumference of the hole 25 to be integral with the side portion 18B. The inner ring of the bearing 14b1 is attached to the bearing receiver 15b1 to be integral with the second rotator 3. The inner ring of the bearing 14b2 is attached to the bearing receiver 15b2 to be integral with the second rotator 3.

The side portion 18A is placed on the first end of the base 17 in the first axial direction and on the first end of the base 17 in the second axial direction and is fastened to the base 17 with screws at the two corners. The side portion 18B is placed on the first end of the base 17 in the first axial direction and on the second end of the base 17 in the second axial direction and is fastened to the base 17 with screws at the two corners.

The three spheres 5A, 5B, and 5C are held between the concave surface 7 and the convex surface 13 to transmit a driving force between the first rotator 2 and the second rotator 3.

The convex surface 13 has two grooves 29 and 30. The concave surface 7 has three holes 32A, 32B, and 32C. The hole 32A partially receives the sphere 5A. The hole 32B partially receives the sphere 5B. The hole 32C partially receives the sphere 5C. The groove 29 receives a part of the sphere 5A protruding from the hole 32A and a part of the sphere 5B protruding from the hole 32B. The groove 30 receives a part of the sphere 5C protruding from the hole 32C.

The holes 32A, 32B, and 32C are at the three vertices of an equilateral triangle as viewed from the first end of the concave surface 7 in the first axial direction. In other words, the holes 32A, 32B, and 32C are located at intervals of 120 degrees about the rotation axis $\alpha$.

The grooves 29 and 30 are located apart from each other in, for example, the second axial direction. The grooves 29 and 30 are each mirror-image symmetric with a surface including the rotation axis $\beta$ and a farthest protruding portion of the convex surface 13 as a symmetry plane.

More specifically, the groove 29 includes a single substantially V-shaped bend. The bend includes one vertex and two sides. The two sides extend in a portion of the second rotator 3 toward a first end of the second rotator 3 in the second axial direction (hereafter, the vertex of the bend in the groove 29 may be referred to as a vertex 29T, and the two sides as sides 29A and 29B). The vertex 29T in the groove 29 is located on the symmetry plane. The two sides 29A and 29B extend from the vertex 29T toward the first end in the second axial direction.

The groove 30 has a substantially V-shape that is flatter than the groove 29, and includes, similarly to the groove 29, a single bend (hereafter, the vertex of the bend in the groove 30 may be referred to as a vertex 30T, and the two sides as sides 30A and 30B). The vertex 30T in the groove 30 is located on the symmetry plane. The two sides 30A and 30B extend from the vertex 30T toward the first end in the second axial direction.

The rotation direction of the first rotator 2 (or the circumferential direction of the first rotator 2, which may be hereafter referred to as a first circumferential direction) is defined as described below.

Figure 6:
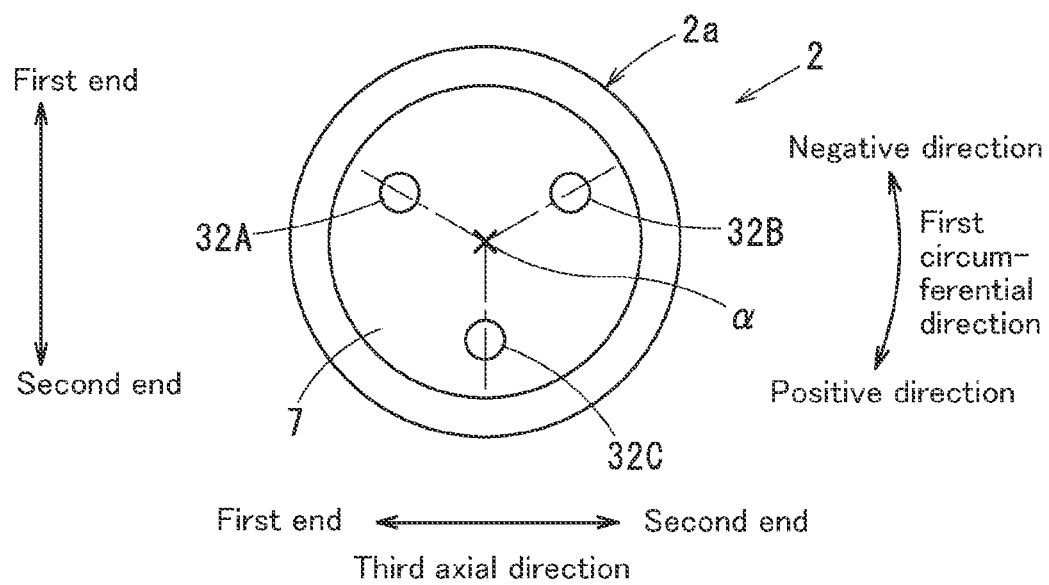
FIG. 6 is a view of a first transmitter in the reference state as viewed from its first end in the first axial direction (first embodiment).
Figure 7:
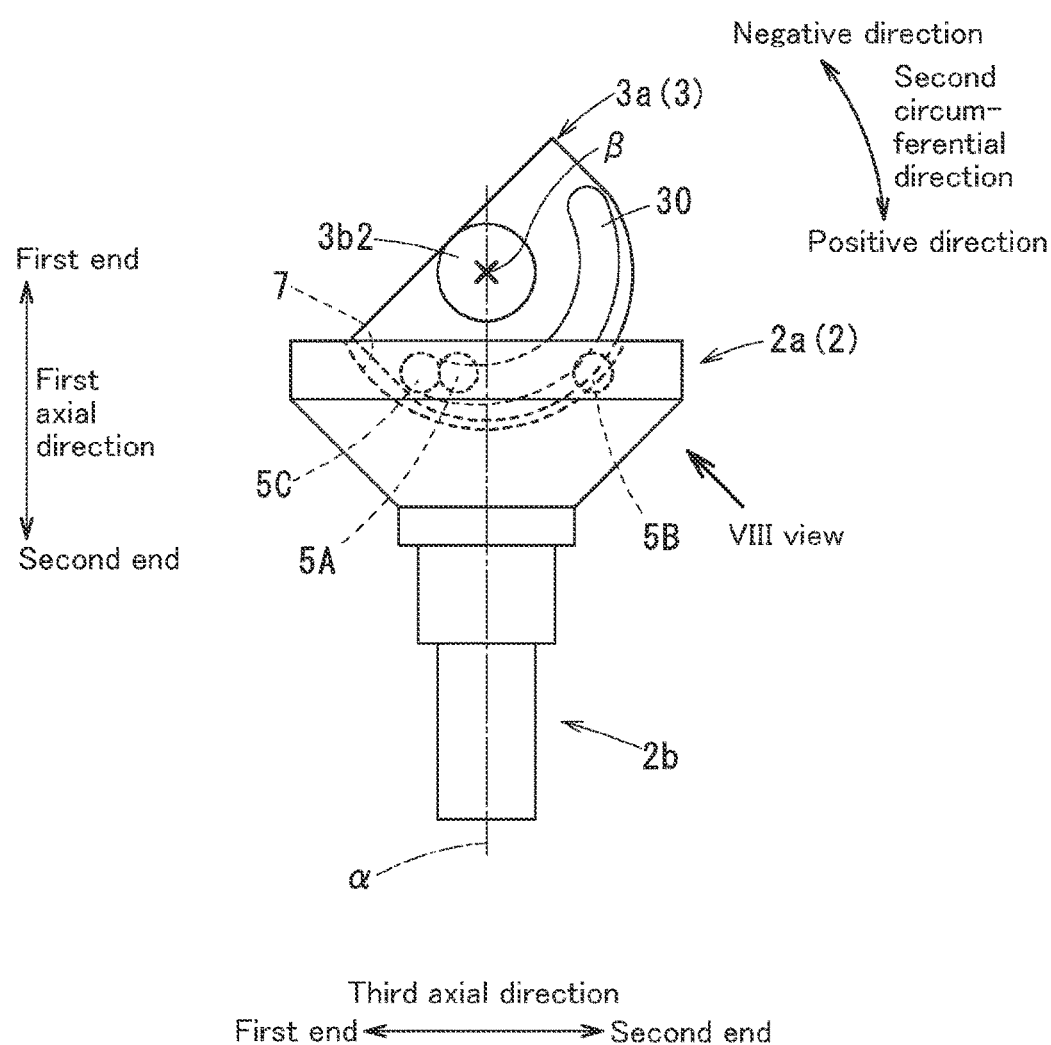
FIG. 7 is a view of the first rotator and the second rotator as viewed from their second ends in the second axial direction when the second rotator is driven to rotate by −45° (first embodiment).
Figure 8:
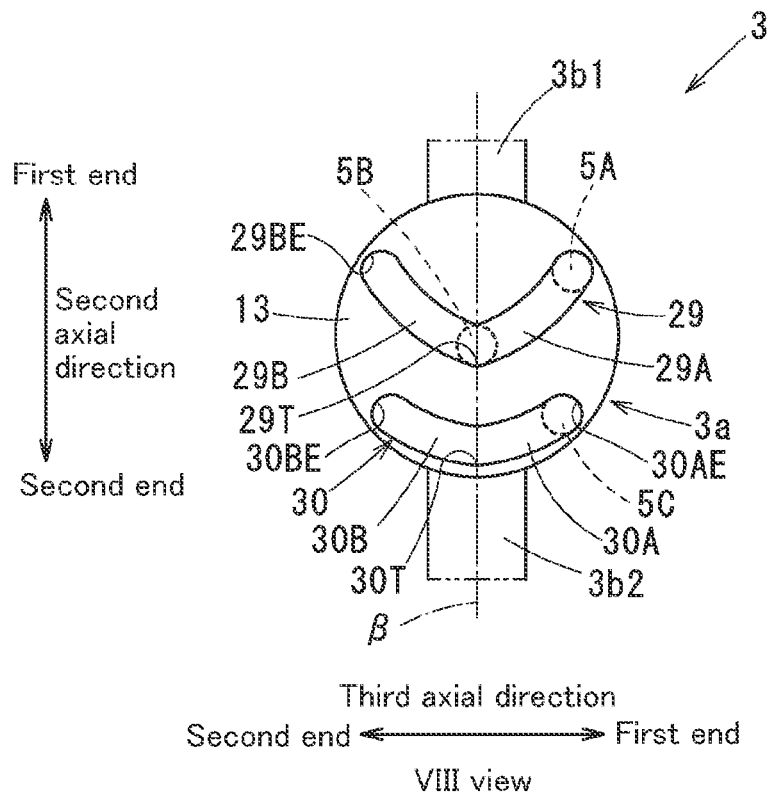
FIG. 8 is a view of the second transmitter as viewed in VIII direction in FIG. 7 when the second rotator is driven to rotate by −45° (first embodiment).
Figure 9:
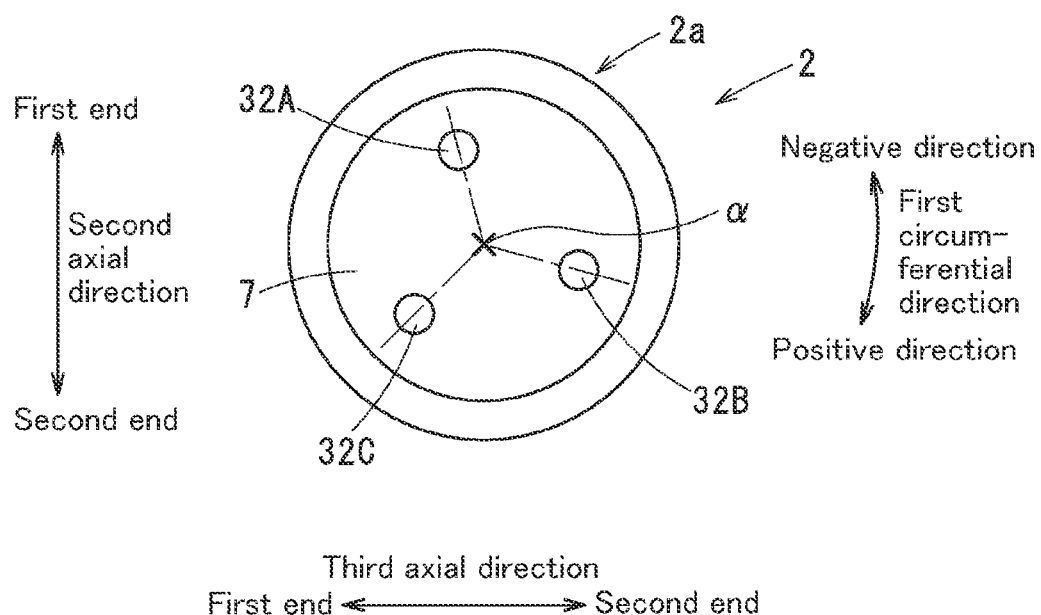
FIG. 9 is a view of the first transmitter as viewed from its first end in the first axial direction when the second rotator is driven to rotate by −45° (first embodiment).
Figure 10:
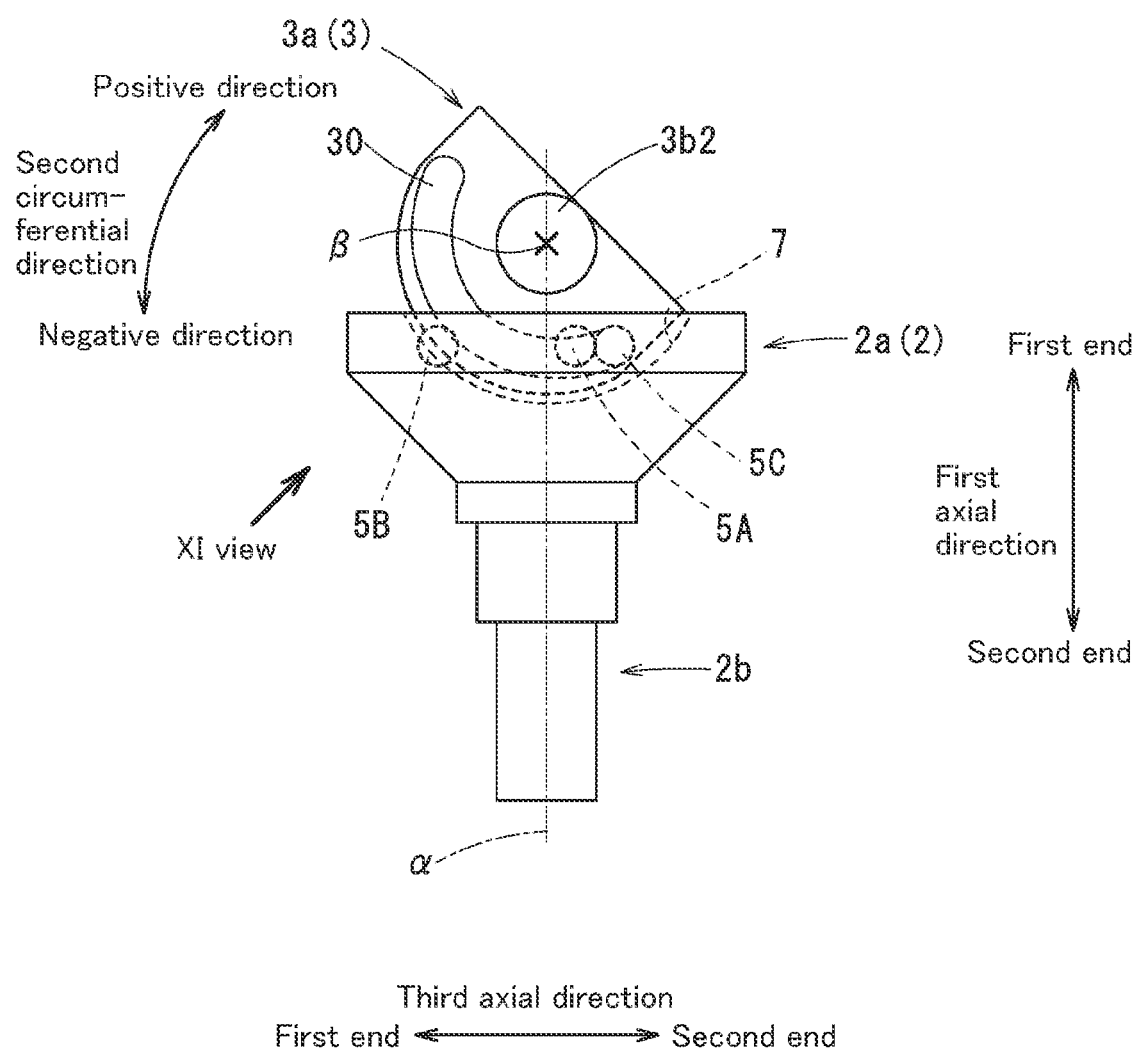
FIG. 10 is a view of the first rotator and the second rotator as viewed from their second ends in the second axial direction when the second rotator is driven to rotate by 45° (first embodiment).
Figure 11:
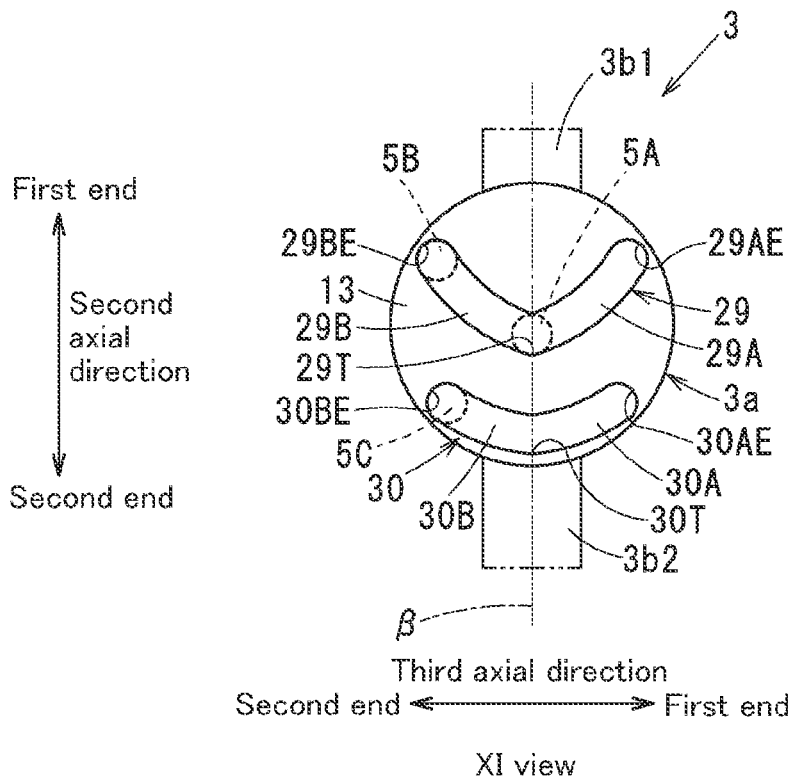
FIG. 11 is a view of the second transmitter as viewed in XI direction in FIG. 10 when the second rotator is driven to rotate by 45° (first embodiment).
Figure 12:
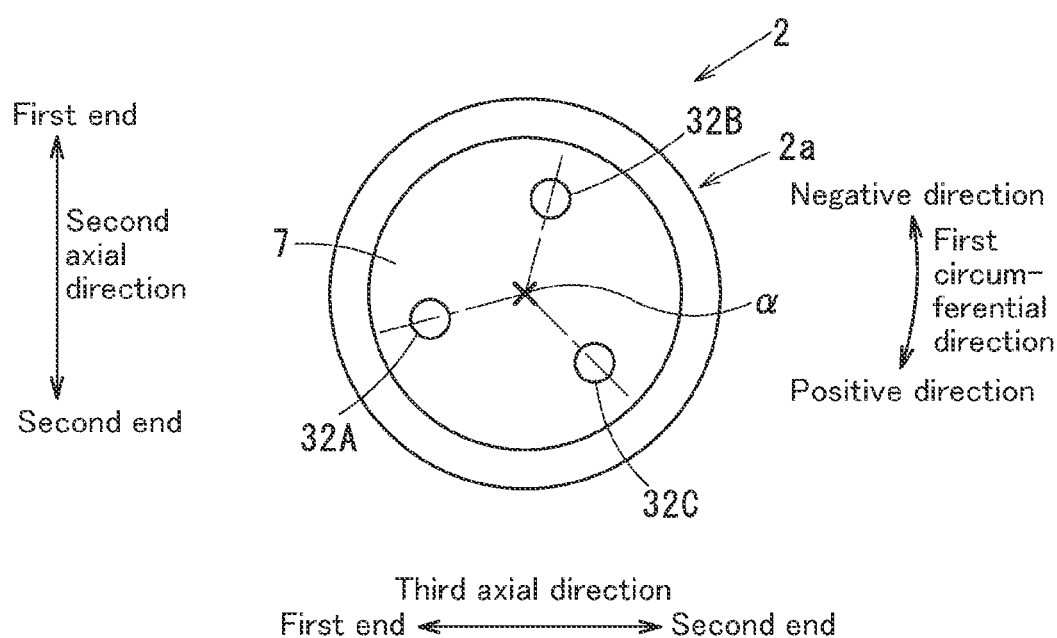
FIG. 12 is a view of a concave surface as viewed from its first end in the first axial direction when the second rotator is driven to rotate in a positive direction (first embodiment).

The direction in which the first rotator 2 rotates clockwise as viewed from its first end in the first axial direction is defined as a positive direction, and the direction in which the first rotator 2 rotates counterclockwise is defined as a negative direction (refer to, for example, FIG. 6).

The rotation direction of the second rotator 3 (or the circumferential direction of the second rotator 3, which may be hereafter referred to as a second circumferential direction) is defined as described below.

Figure 4:
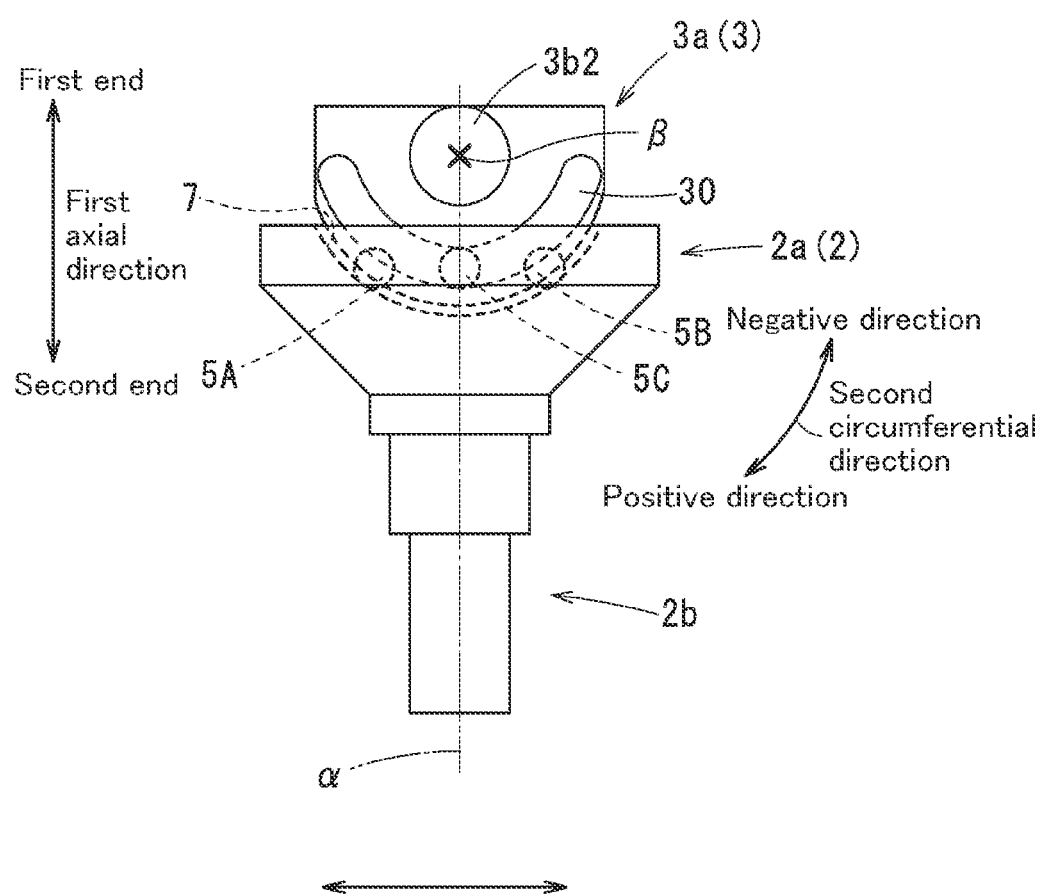
FIG. 4 is a view of a first rotator and a second rotator in a reference state as viewed from their second ends in the second axial direction (first embodiment).

The direction in which the second rotator 3 rotates clockwise as viewed from its second end in the second axial direction is defined as a positive direction and the direction in which the second rotator 3 rotates counterclockwise is defined as a negative direction (refer to, for example, FIG. 4).

The side 29A in the groove 29 in the area in the positive second circumferential direction may be referred to as a first portion 29A. The side 29B in the groove 29 in the area in the negative second circumferential direction may be referred to as a second portion 29B. Similarly, the side 30A in the groove 30 in the area in the positive second circumferential direction may be referred to as a first portion 30A. The side 30B in the groove 30 in the area in the negative second circumferential direction may be referred to as a second portion 30B (refer to, for example, FIG. 5). Further, the end of the first portion 29A opposite to the vertex 29T may be referred to as a first end 29AE. The end of the second portion 29B opposite to the vertex 29T may be referred to as a second end 29BE. The end of the first portion 30A opposite to the vertex 30T may be referred to as a first end 30AE. The end of the second portion 30B opposite to the vertex 30T may be referred to as a second end 30BE (refer to, for example, FIG. 5).

A reference state of the driving force transmission device 1 with a rotation angle of 0°, or in other words, the position of the driving force transmission device 1 at which the rotation angles of the first rotator 2 and the second rotator 3 are both 0° is defined as described below.

Figure 5:
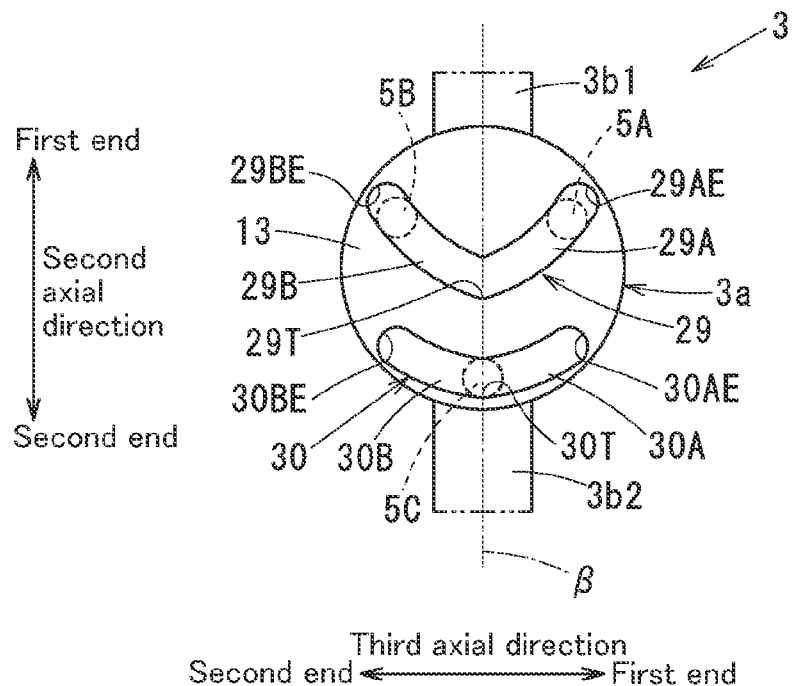
FIG. 5 is a view of a second transmitter in the reference state as viewed from its second end in a first axial direction (first embodiment).

In the reference state, as shown in FIGS. 4 to 6, the holes 32A and 32B as well as the spheres 5A and 5B are at the same position with respect to the second axial direction. The holes 32A and 32B as well as the spheres 5A and 5B are also mirror-image symmetric with a surface perpendicular to the third axial direction including the rotation axis β as a symmetry plane. The hole 32C and the sphere 5C are nearer the second end of the second rotator 3 in the second axial direction than the holes 32A and 32B and the spheres 5A and 5B and on the same line as the rotation axis β in the third axial direction.

In the reference state, the vertex 29T in the groove 29 and the vertex 30T in the groove 30 are on the same line as the rotation axis β in the third axial direction. The first portion 29A and the second portion 29B extend from the vertex 29T toward the first end in the second axial direction and are mirror-image symmetric with respect to the surface perpendicular to the third axial direction including the rotation axis β as a symmetry plane. The first portion 30A and the second portion 30B are mirror-image symmetric, similarly to the groove 29.

Further, in the reference state, the sphere 5A is located between the vertex 29T and the first end 29AE in the first portion 29A, and the sphere 5B is located between the vertex 29T and the second end 29BE in the second portion 29B. The sphere 5C is located at the vertex 30T. Further, the concave surface 7 and the convex surface 13 are out of contact with each other.

The grooves 29 and 30 are located to allow the first rotator 2 and the second rotator 3 to be rotatable in, for example, the rotation ranges described below.

The first rotator 2 has a rotation range from −45° to 45° about the rotation axis α. The second rotator 3 has a rotation range from 45° to −45° about the rotation axis β.

More specifically, when the first rotator 2 rotates from a rotation angle of 0° to −45° about the rotation axis α, the second rotator 3 rotates from a rotation angle of 0° to −45° about the rotation axis β. In this case, the spheres 5A, 5B, and 5C in the respective holes 32A, 32B, and 32C revolve about the rotation axis α by 45°. The sphere 5A moves from its position in the reference state to the first end 29AE along the first portion 29A in the groove 29. The sphere 5B moves from its position in the reference state to the vertex 29T along the second portion 29B in the groove 29. Further, the sphere 5C moves from the vertex 30T to the first end 30AE along the first portion 30A in the groove 30 (refer to FIGS. 4 to 6 and FIGS. 7 to 9).

When the first rotator 2 rotates from a rotation angle of 0° to −45° about the rotation axis α, the second rotator 3 rotates from a rotation angle of 0° to 45° about the rotation axis β. In this case, the spheres 5A, 5B, and 5C in the respective holes 32A, 32B, and 32C revolve about the rotation axis α by −45°. The sphere 5A moves from its position in the reference state to the vertex 29T along the first portion 29A in the groove 29. The sphere 5B moves from its position in the reference state to the second end 29BE along the second portion 29B in the groove 29. Further, the sphere 5C moves from the vertex 30T to the second end 30BE along the second portion 30B in the groove 30 (refer to FIGS. 4 to 6 and FIGS. 10 to 12).

Operating Characteristics in First Embodiment

Figure 13:
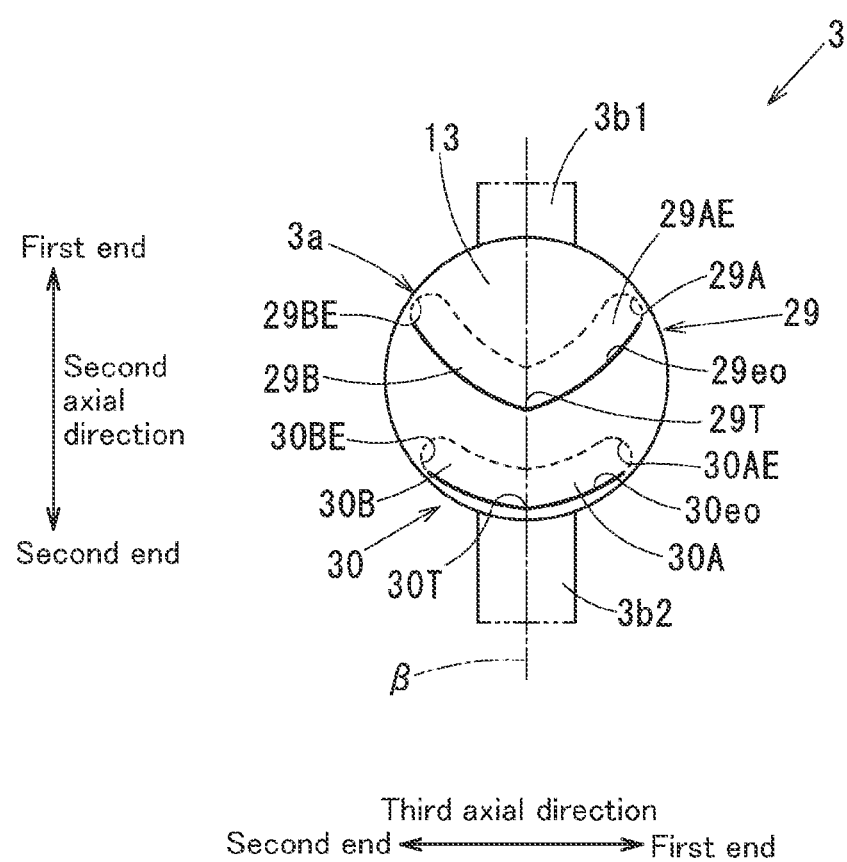
FIG. 13 is a diagram describing an outer opening edge of an opening edge in a bend in each groove (first embodiment).

The operating characteristics of the driving force transmission device 1 according to the first embodiment will now be described with reference to, for example, FIGS. 13 to 15. The operating characteristics include the pressure angle described below.

The pressure angle is defined for each of the spheres 5A, 5B, and 5C specifically as described below.

A pressure angle θA of the sphere 5A is defined as an angle formed between the direction normal to an outer opening edge 29eo in the bend at the entire opening edge of the groove 29 and the moving direction of the sphere 5A (or the direction in which the sphere 5A revolves about the rotation axis α) under a driving force being transmitted between the outer opening edge 29eo and the sphere 5A. Similarly, a pressure angle θB of the sphere 5B is defined as an angle formed between the direction normal to the outer opening edge 29eo and the moving direction of the sphere 5B (or the direction in which the sphere 5B revolves about the rotation axis α) under a driving force being transmitted between the outer opening edge 29eo and the sphere 5B.

Further, a pressure angle θC of the sphere 5C is defined as an angle formed between the direction normal to an outer opening edge 30eo in the bend at the entire opening edge of the groove 30 and the moving direction of the sphere 5C (or the direction in which the sphere 5C revolves about the rotation axis α) under a driving force being transmitted between the outer opening edge 30eo and the sphere 5C.

The outer opening edge 29eo refers to the outer portion in the bend at the entire opening edge of the groove 29, and more specifically, the portions of the opening edges of the first portion 29A, the second portion 29B, and the vertex 29T at a second end in the second axial direction. More specifically, a bold solid line in FIG. 13 indicates the outer opening edge 29eo of the entire opening edge of the groove 29. In FIG. 13, a dotted line indicates the portion of the entire opening edge of the groove 29 other than the outer opening edge 29eo.

The same applies to the outer opening edge 30eo in the groove 30.

The pressure angles θA, θB, and θC change as the driving force transmission device 1 operates, or specifically the second rotator 3 rotates under an external driving force to rotate the first rotator 2 with the spheres 5A, 5B, and 5C between them. In other words, the second rotator 3 performs an input operation and the first rotator 2 performs an output operation. Such changes in the pressure angles θA, θB, and θC will now be described.

When the second rotator 3 rotates from a rotation angle of −45° to 45° under an external driving force, the first rotator 2 is driven to rotate from 45° to −45°. In this case, the driving force is transmitted between the outer opening edge 29eo and the sphere 5B to form the pressure angle θB, and between the outer opening edge 30eo and the sphere 5C to form the pressure angle θC. No driving force is transmitted between the outer opening edge 29eo and the sphere 5A, and the pressure angle θA is thus not formed.

More specifically, the pressure angles θB and θC are set, for example, to change in the manner described below. As shown in FIG. 14, the pressure angle θB uniformly decreases, for example, from 54° to 15° in response to the second rotator 3 rotating from a rotation angle of −45° to 45°. The pressure angle θC is not formed while the second rotator 3 rotates from a rotation angle of −45° to 0° under no driving force being transmitted between the outer opening edge 30eo and the sphere 5C. The pressure angle θC uniformly decreases, for example, from 90° to 68° in response to the second rotator 3 rotating from a rotation angle of 0° to 45°.

When the second rotator 3 rotates from a rotation angle of 45° to −45° under an external driving force, the first rotator 2 is driven to rotate from −45° to 45°. In this case, the driving force is transmitted between the outer opening edge 29eo and the sphere 5A to form the pressure angle θA, and between the outer opening edge 30eo and the sphere 5C to form the pressure angle θC. No driving force is transmitted between the outer opening edge 29eo and the sphere 5B, and the pressure angle θB is thus not formed.

More specifically, the pressure angles θA and θC are set, for example, to change in the manner described below. As shown in FIG. 15, the pressure angle θA uniformly decreases, for example, from 54° to 15° in response to the second rotator 3 rotating from a rotation angle of 45° to −45°. The pressure angle θC is not formed while the second rotator 3 rotates from a rotation angle of 45° to 0° under no driving force being transmitted between the outer opening edge 30eo and the sphere 5C. The pressure angle θC uniformly decreases, for example, from 90° to 68° in response to the second rotator 3 rotating from a rotation angle of 0° to −45°.

As described above, when the second rotator 3 performs the input operation and the first rotator 2 performs the output operation in the driving force transmission device 1, the pressurized state defined below occurs throughout the rotation ranges of the first rotator 2 and the second rotator 3. The pressurized state is defined herein as the state in which at least one of the pressure angles θA, θB, and θC of the spheres 5A, 5B, and 5C between the concave surface 7 and the convex surface 13 is 60° or less.

In other words, when the second rotator 3 performs the input operation and the first rotator 2 performs the output operation in the driving force transmission device 1, at least one of the pressure angles θA, θB, and θC is 60° or less, irrespective of the rotation angles of the first rotator 2 and the second rotator 3.

Figure 14:
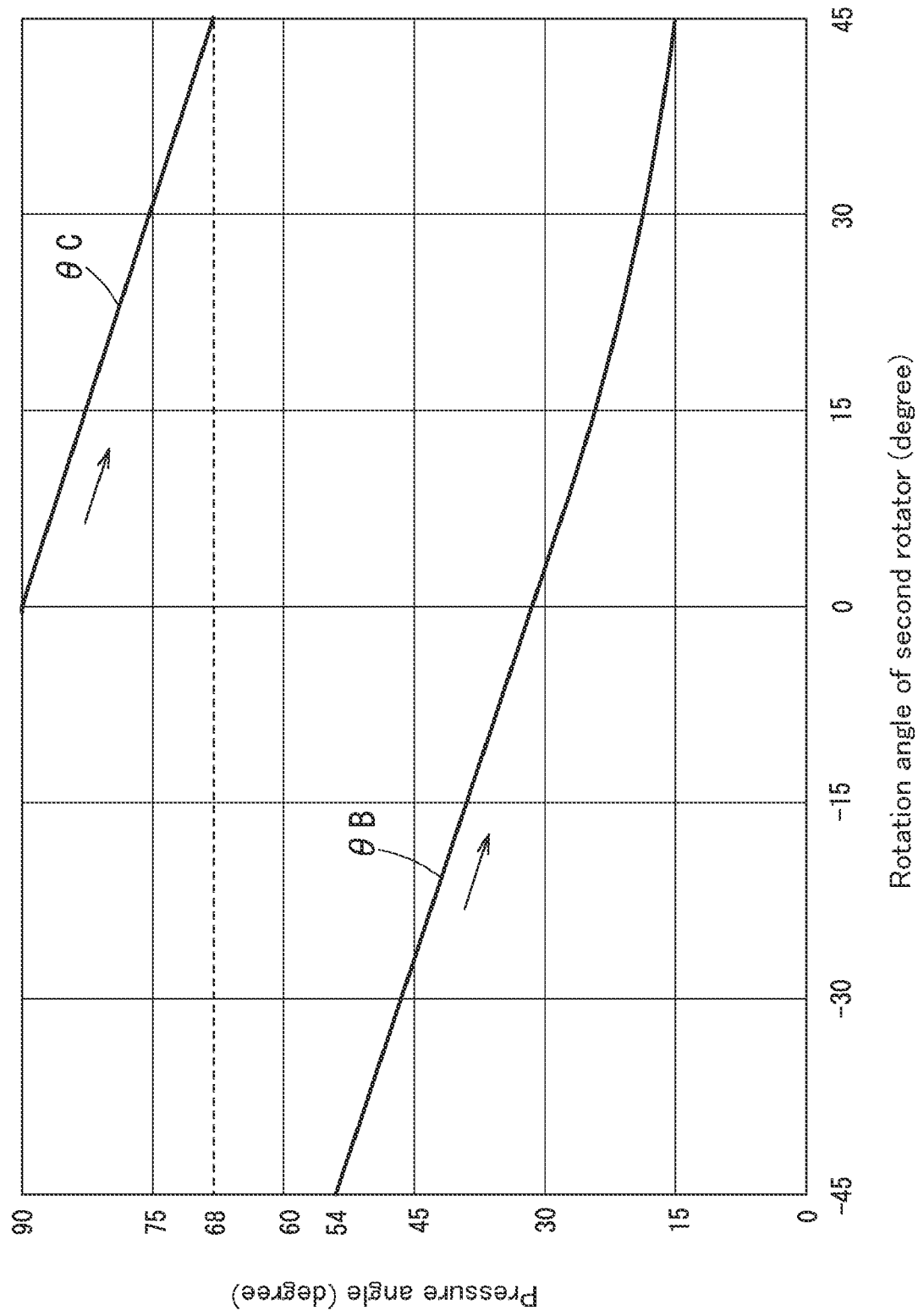
FIG. 14 is a characteristic diagram showing the operating characteristics of the driving force transmission device when the second rotator is driven to rotate in the positive direction (first embodiment).

More specifically, when the second rotator 3 is driven to rotate in the positive second circumferential direction to perform the input operation, the pressure angle θB is constantly 60° or less, irrespective of the rotation angles of the first rotator 2 and the second rotator 3 (refer to FIG. 14). More specifically, when the second rotator 3 is driven to rotate in the positive second circumferential direction to perform the input operation, the sphere 5B is in contact with the portion of the outer opening edge 29eo defining the vertex 29T and the second portion 29B to form a pressure angle of 60° or less between them.

Figure 15:
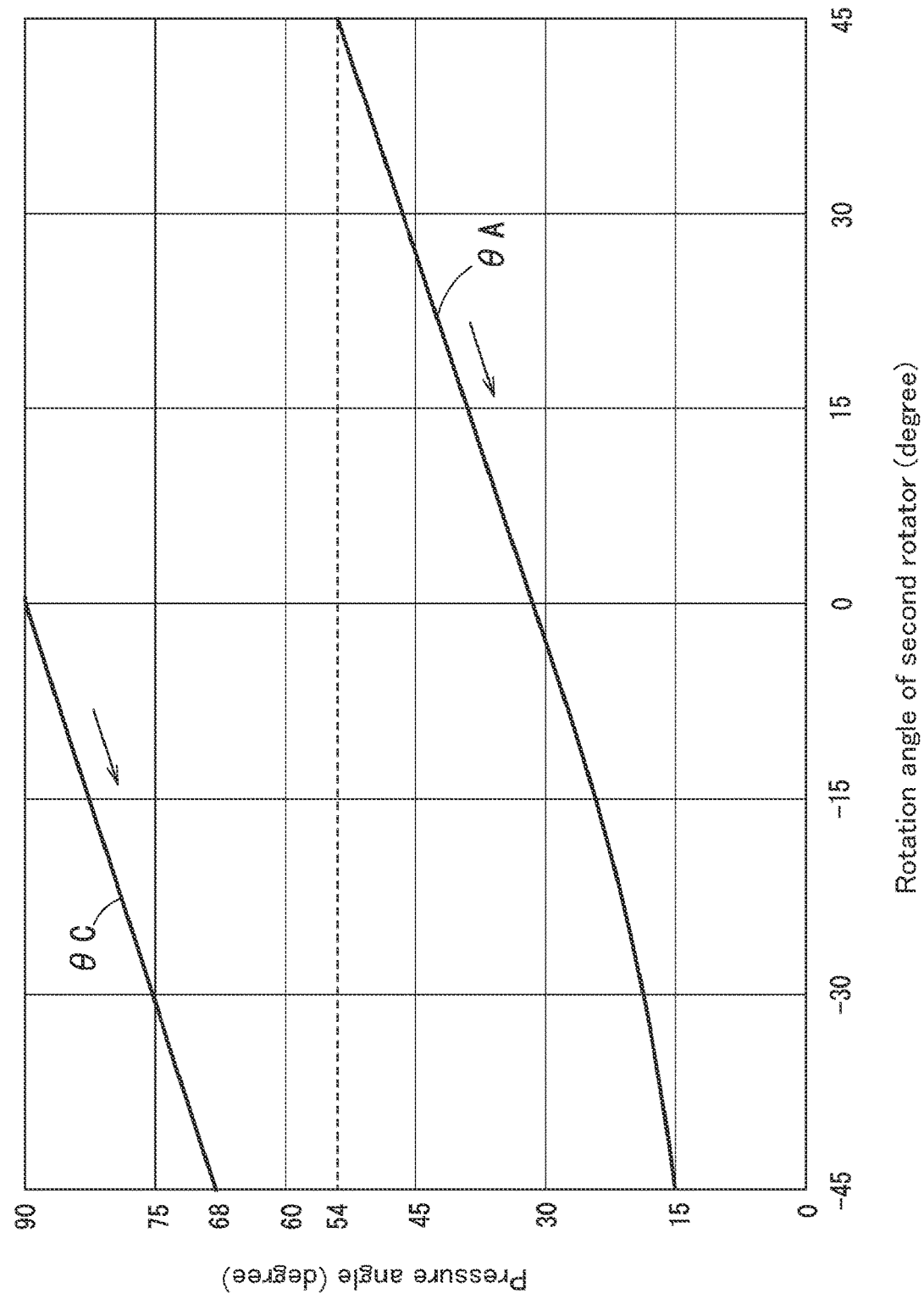
FIG. 15 is a characteristic diagram showing the operating characteristics of the driving force transmission device when the second rotator is driven to rotate in a negative direction (first embodiment).
Figure 16:
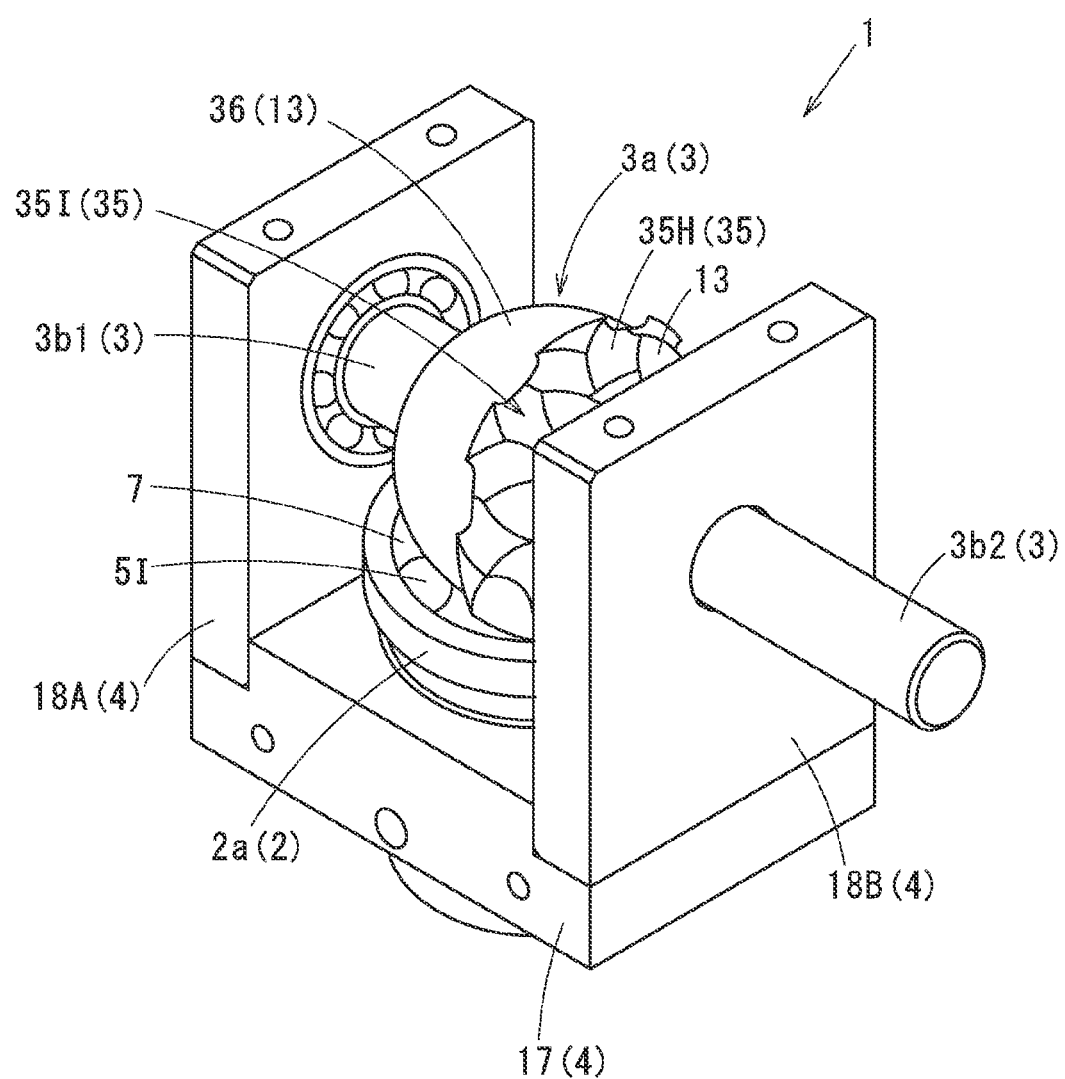
FIG. 16 is a perspective view of a driving force transmission device (second embodiment).
Figure 17:
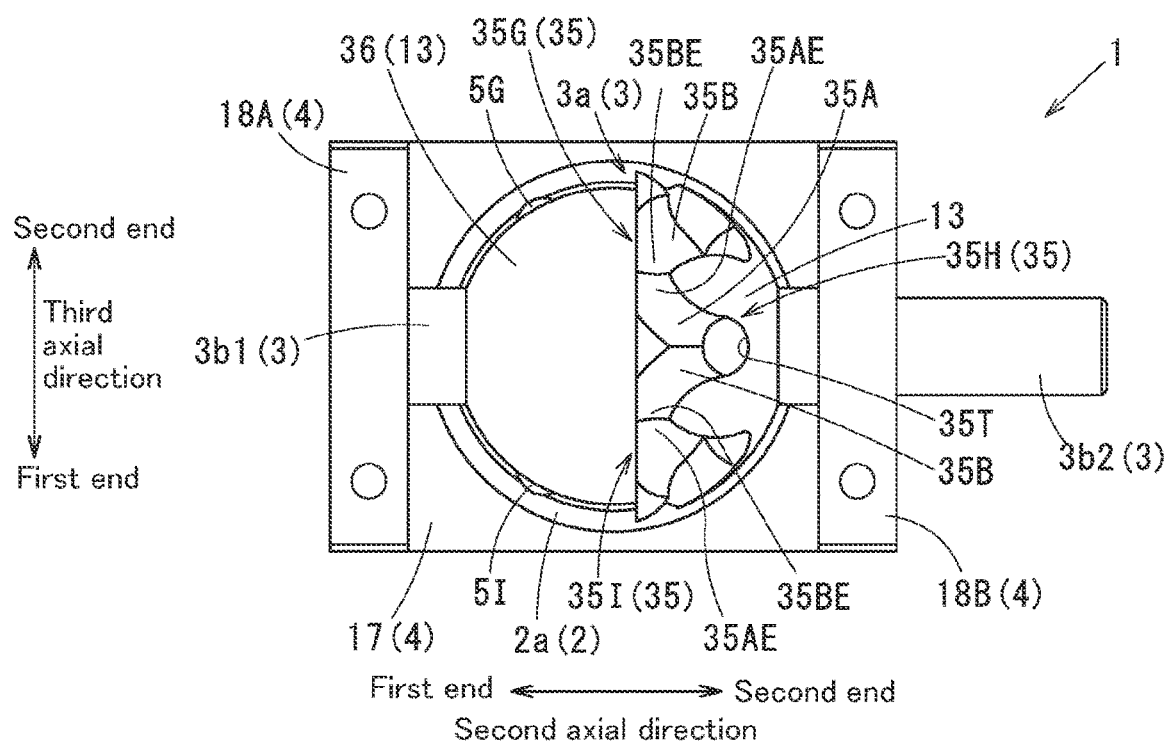
FIG. 17 is a plan view of the driving force transmission device (second embodiment).
Figure 18:
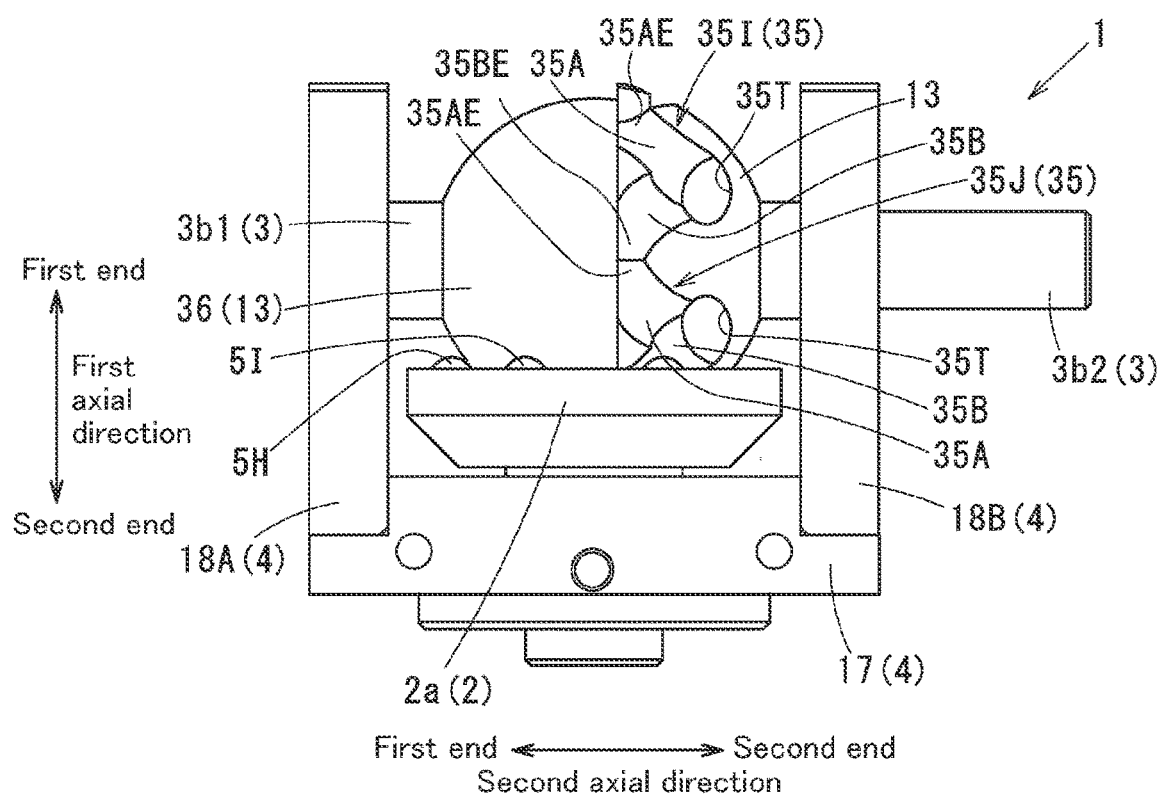
FIG. 18 is a side view of the driving force transmission device as viewed from its first end in a third axial direction (second embodiment).

Similarly, when the second rotator 3 is driven to rotate in the negative second circumferential direction, the pressure angle θA is constantly 60° or less, irrespective of the rotation angles of the first rotator 2 and the second rotator 3 (refer to FIG. 15). More specifically, when the second rotator 3 is driven to rotate in the negative second circumferential direction to perform the input operation, the sphere 5A is in contact with the portion of the outer opening edge 29eo defining the vertex 29T and the first portion 29A to form a pressure angle of 60° or less between them.

When the first rotator 2 performs the input operation and the second rotator 3 performs the output operation as well, the pressurized state occurs throughout the rotation ranges of the first rotator 2 and the second rotator 3, irrespective of whether the first rotator 2 is driven to rotate in the positive first circumferential direction or in the negative first circumferential direction, which will not be described.

Operations in First Embodiment

The driving force transmission device 1 according to the first embodiment includes the first rotator 2, the second rotator 3, and the spheres 5A, 5B, and 5C described below. The first rotator 2 performs one of the input operation and the output operation of a driving force and includes the concave surface 7. The second rotator 3 performs the other of the input operation and the output operation of a driving force and includes the convex surface 13 fitted into the concave surface 7. The spheres 5A, 5B, and 5C are held between the concave surface 7 and the convex surface 13.

The concave surface 7 has the hole 32A to receive the sphere 5A, the hole 32B to receive the sphere 5B, and the hole 32C to receive the sphere 5C. The convex surface 13 has the grooves 29 and 30 that receive the part of the sphere 5A protruding from the hole 32A, the part of the sphere 5B protruding from the hole 32B, and the part of the sphere 5C protruding from the hole 32C. The groove 29 includes the bend including the single vertex 29T as well as the first portion 29A and the second portion 29B extending toward the first end in the second axial direction as two sides. Similarly, the groove 30 includes the bend including the single vertex 30T as well as the first portion 30A and the second portion 30B extending toward the first end in the second axial direction as two sides.

When one of the first rotator 2 and the second rotator 3 is driven to rotate under an external driving force, the spheres 5A, 5B, and 5C in the respective holes 32A, 32B, and 32C revolve about the rotation axis α to move along the grooves 29 and 30. In this case, the concave surface 7 and the convex surface 13 are out of contact with each other.

Further, the holes 32A, 32B, and 32C and the grooves 29 and 30 are located to create the pressurized state throughout the rotation ranges of the first rotator 2 and the second rotator 3.

This causes far less backlash than known driving force transmission using bevel gears.

The holes 32A, 32B, and 32C and the grooves 29 and 30 are located to create the pressurized state throughout the rotation ranges of the first rotator 2 and the second rotator 3. More specifically, at least one of the pressure angle θA of the sphere 5A, the pressure angle θB of the sphere 5B, and the pressure angle θC of the sphere 5C is 60° or less throughout the rotation ranges of the first rotator 2 and the second rotator 3. This reliably places the first rotator 2 under a driving force in the first circumferential direction and the second rotator 3 under a driving force in the second circumferential direction, causing the first rotator 2 and the second rotator 3 to rotate.

More specifically, when, for example, the second rotator 3 is driven to rotate in the positive second circumferential direction to perform the input operation, the pressure angle θB is constantly 60° or less (refer to FIG. 14). In other words, the sphere 5B is in contact with the portion of the outer opening edge 29eo defining the vertex 29T and the second portion 29B to form the pressure angle θB of 60° or less between them. This reliably generates a force component that acts on the sphere 5B in the first circumferential direction from the outer opening edge 29eo. This reliably rotates the first rotator 2 in the first circumferential direction to perform the output operation.

When the second rotator 3 is driven to rotate in the negative second circumferential direction to perform the input operation, the pressure angle θA is constantly 60° or less (refer to FIG. 15). In other words, the sphere 5A is in contact with the portion of the outer opening edge 29eo defining the vertex 29T and the first portion 29A to form the pressure angle θA of 60° or less between them. This reliably generates a force component that acts on the sphere 5A in the first circumferential direction from the outer opening edge 29eo. This reliably rotates the first rotator 2 in the first circumferential direction to perform the output operation.

When the first rotator 2 is driven to rotate in the positive first circumferential direction or in the negative first circumferential direction to perform the input operation as well, the pressurized state occurs throughout the rotation ranges of the first rotator 2 and the second rotator 3, thus reliably rotating the second rotator 3 in the second circumferential direction to perform the output operation.

In the driving force transmission device 1 according to the first embodiment, the three spheres 5A, 5B, and 5C are held between the concave surface 7 and the convex surface 13.

This allows the first rotator 2 and the second rotator 3 to support each other at three points. This structure allows the first rotator 2 and the second rotator 3 to rotate stably.

Structure in Second Embodiment

A driving force transmission device 1 according to a second embodiment will now be described with reference to, for example, FIGS. 16 to 26.

Figure 19:
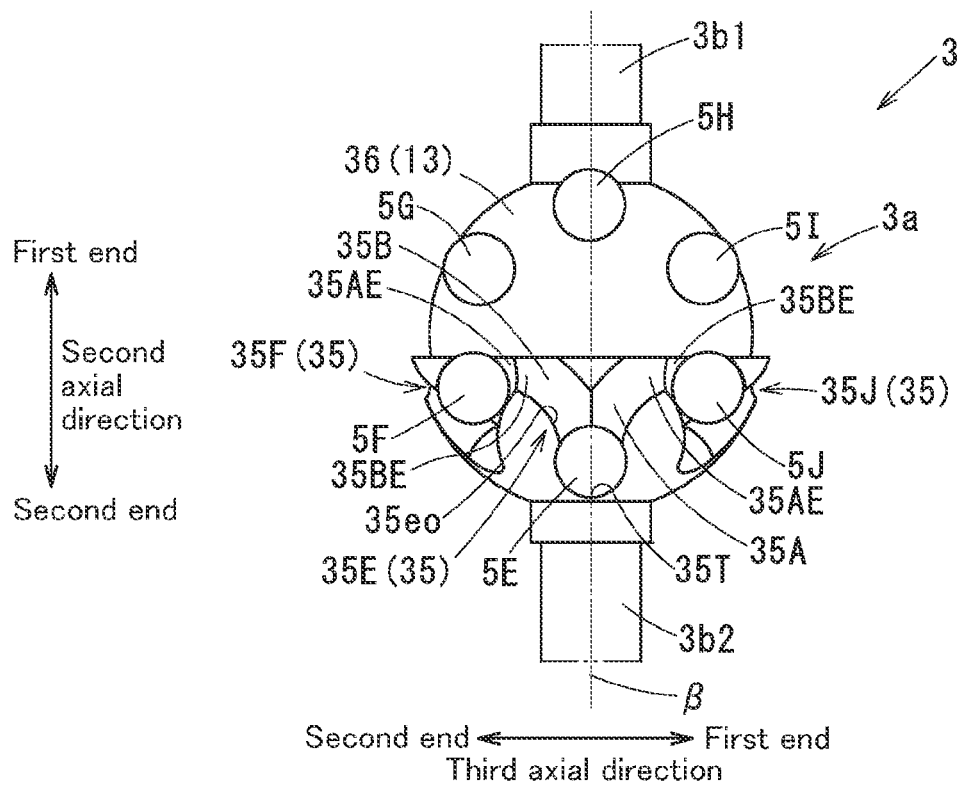
FIG. 19 is a view of a second transmitter and spheres in the reference state as viewed from their second ends in the first axial direction (second embodiment).

The driving force transmission device 1 according to the second embodiment transmits a driving force between a first rotator 2 and a second rotator 3 with six spheres 5E, 5F, 5G, 5H, 5I, and 5J (refer to FIG. 19).

Figure 20:
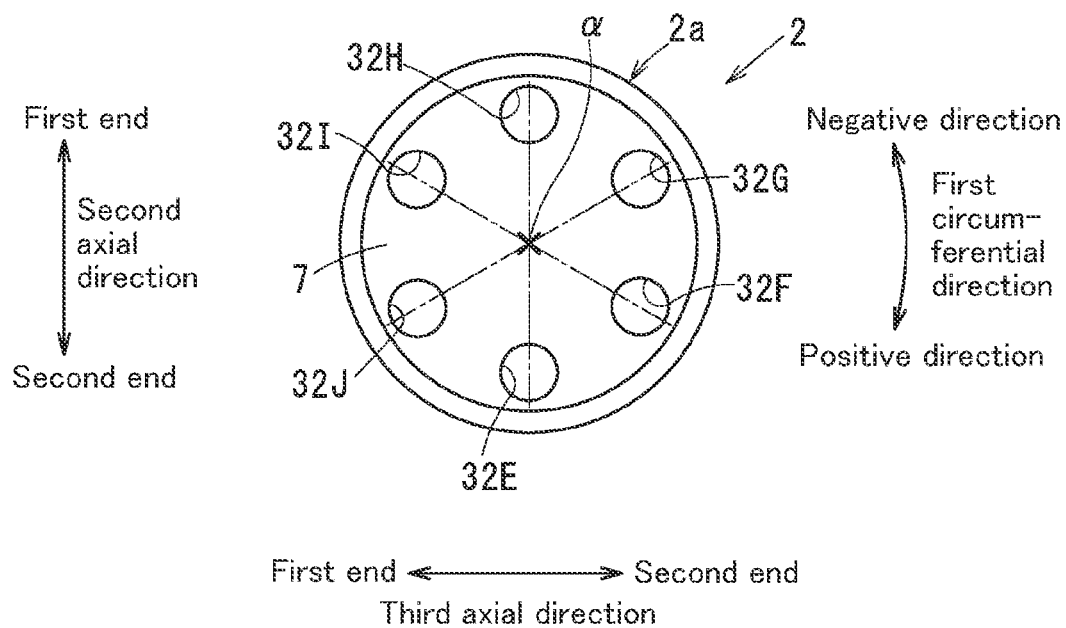
FIG. 20 is a view of a first transmitter in the reference state as viewed from its first end in the first axial direction (second embodiment).
Figure 21:
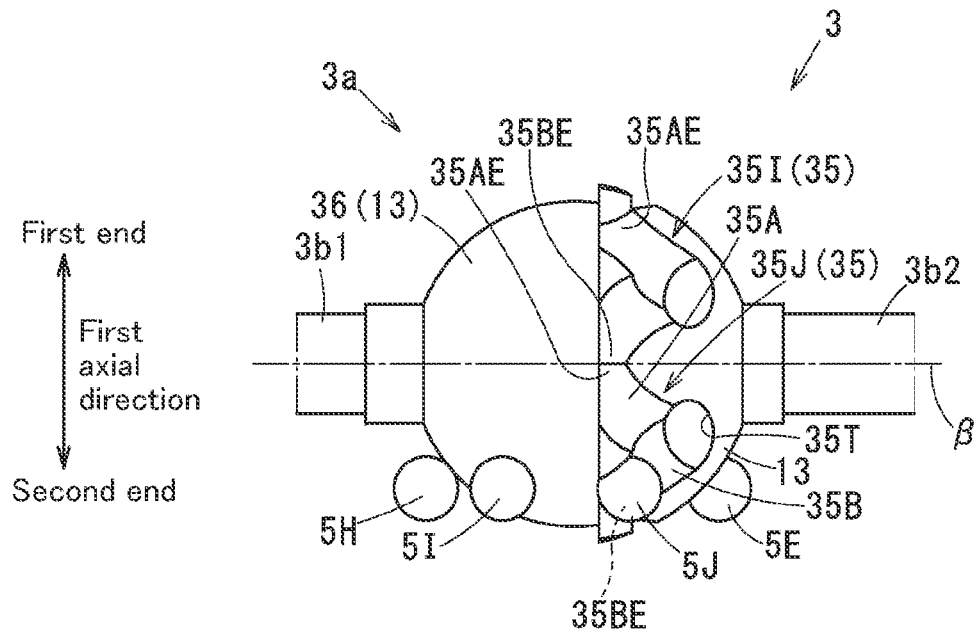
FIG. 21 is a view of the second transmitter and the spheres in the reference state as viewed from their first ends in the third axial direction (second embodiment).

The first rotator 2 in the second embodiment has holes 32E, 32F, 32G, 32H, 32I, and 32J that respectively receive the spheres 5E, 5F, 5G, 5H, 5I, and 5J (refer to FIG. 20). The holes 32E, 32F, 32G, 32H, 32I, and 32J are located at the six vertices of a regular hexagon as viewed from the first end of a concave surface 7 in the first axial direction. The spheres 5E, 5F, 5G, 5H, 5I, and 5J as well as the holes 32E, 32F, 32G, 32H, 32I, and 32J are arranged in the negative first circumferential direction in this order as viewed from the first end of the concave surface 7 in the first axial direction.

The second rotator 3 in the second embodiment includes a substantially spherical second transmitter 3a. The second transmitter 3a includes a convex surface 13 on its entire surface. The second transmitter 3a has a groove 35 described below.

The groove 35 in the second embodiment includes six substantially V-shaped bends that are the same as in the first embodiment in the second circumferential direction. The six bends are continuous with one another, defining a circumference about a rotation axis β (refer to, for example, FIG. 22).

The convex surface 13 includes a receding surface 36 located in an area toward a first end of the second rotator 3 from a predetermined position in the second axial direction. The receding surface 36 recedes by the depth of the groove 35. The groove 35 is located in an area toward a second end of the second rotator 3 from the predetermined position in the second axial direction. The receding surface 36 is a spherical surface (refer to, for example, FIGS. 17 and 18).

The bends in the groove 35 each may be hereafter referred to as bends 35E, 35F, 35G, 35H, 35I, and 35J. The bends 35E, 35F, 35G, 35H, 35I, and 35J are arranged in the negative second circumferential direction in this order as viewed from their second ends in the second axial direction (refer to, for example, FIG. 22).

The bend 35E is mirror-image symmetric with a surface including the rotation axis β as a symmetry plane. The bend 35E includes a vertex 35T on the symmetry plane and a first portion 35A and a second portion 35B extending from the vertex 35T toward its second end in the second axial direction as two sides (refer to, for example, FIG. 19). Of the two sides, the first portion 35A is located in the positive second circumferential direction, similarly to the first portions 29A and 30A in the first embodiment. The second portion 35B is located in the negative second circumferential direction, similarly to the second portions 29B and 30B in the first embodiment.

As in the first embodiment, the end of the first portion 35A opposite to the vertex 35T may be referred to as a first end 35AE. The end of the second portion 35B opposite to the vertex 35T may be referred to as a second end 35BE.

The bends 35F, 35G, 35H, 35I, and 35J have the same shape as the bend 35E and each include the vertex 35T, the first portion 35A, the second portion 35B, the first end 35AE, and the second end 35BE. Further, the bends 35E, 35F, 35G, 35H, 35I, and 35J each include an outer opening edge 35eo, similarly to the grooves 29 and 30 in the first embodiment (refer to, for example, FIGS. 19 and 22).

The first ends 35AE and the second ends 35BE in the bends 35E, 35F, 35G, 35H, 35I, and 35J are all connected to the receding surface 36. The bends 35E and 35F are adjacent to each other in the second circumferential direction and the second end 35BE in the bend 35E and the first end 35AE in the bend 35F are connected to each other at the boundary with the receding surface 36. The same applies to the bends 35F and 35G, the bends 35G and 35H, the bends 35H and 35I, the bends 35I and 35J, and the bends 35J and 35E.

As described above, in the driving force transmission device 1 according to the second embodiment, the groove 35 is located in an area toward the second end from the receding surface 36 in the second axial direction, and the bends 35E, 35F, 35G, 35H, 35I, and 35J are continuous with one another in the second circumferential direction, defining the circumference.

A reference state of the driving force transmission device 1 according to the second embodiment with a rotation angle of 0°, or in other words, a position at which the rotation angles of the first rotator 2 and the second rotator 3 are both 0° is defined as described below.

In the reference state, as shown in, for example, FIGS. 19 and 20, the holes 32F and 32J as well as the spheres 5F and 5J are at the same position with respect to the second axial direction. The holes 32F and 32J as well as the spheres 5F and 5J are also mirror-image symmetric with a surface perpendicular to the third axial direction including the rotation axis β as a symmetry plane. Similarly, the holes 32G and 32I as well as the spheres 5G and 5I are at the same position with respect to the second axial direction. The holes 32G and 32I as well as the spheres 5G and 5I are also mirror-image symmetric with a surface perpendicular to the third axial direction including the rotation axis β as a symmetry plane. The holes 32F and 32J and the spheres 5F and 5J are nearer the second end in the second axial direction than the holes 32G and 32I and the spheres 5G and 5I.

Further, the hole 32E and the sphere 5E are nearer the second end in the second axial direction than the holes 32F and 32J and the spheres 5F and 5J. The hole 32H and the sphere 5H are nearer the first end in the second axial direction than the holes 32G and 32I and the spheres 5G and 5I. The hole 32E, the sphere 5E, the hole 32H, and the sphere 5H are on the surface perpendicular to the third axial direction including the rotation axis β.

Figure 22:
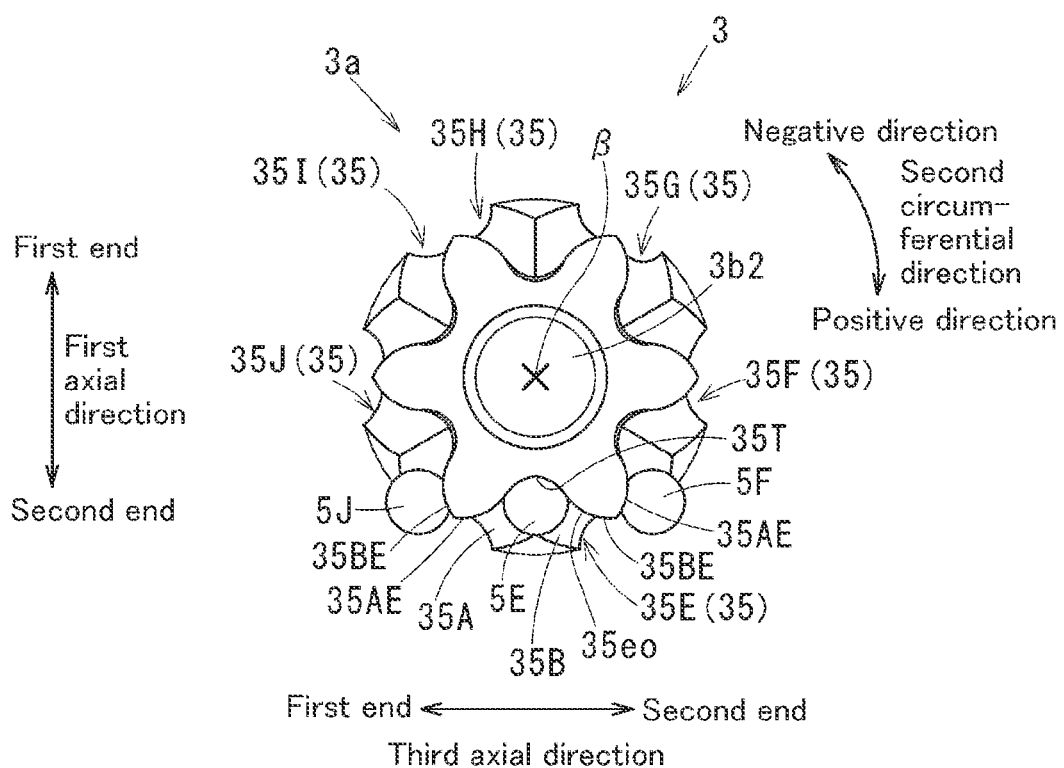
FIG. 22 is a view of a second rotator and the spheres in the reference state as viewed from their second ends in the second axial direction (second embodiment).
Figure 23:
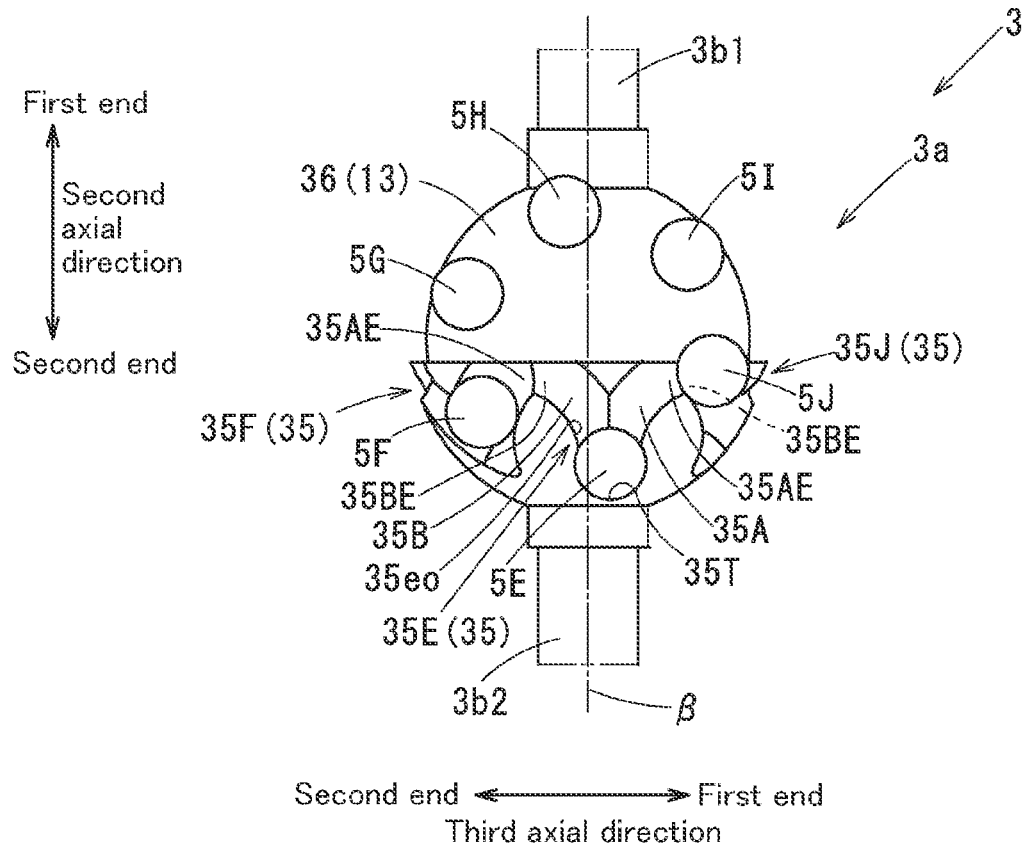
FIG. 23 is a view of the second transmitter and the spheres as viewed from their second ends in the first axial direction when the second rotator is driven to rotate by 10° (second embodiment).
Figure 24:
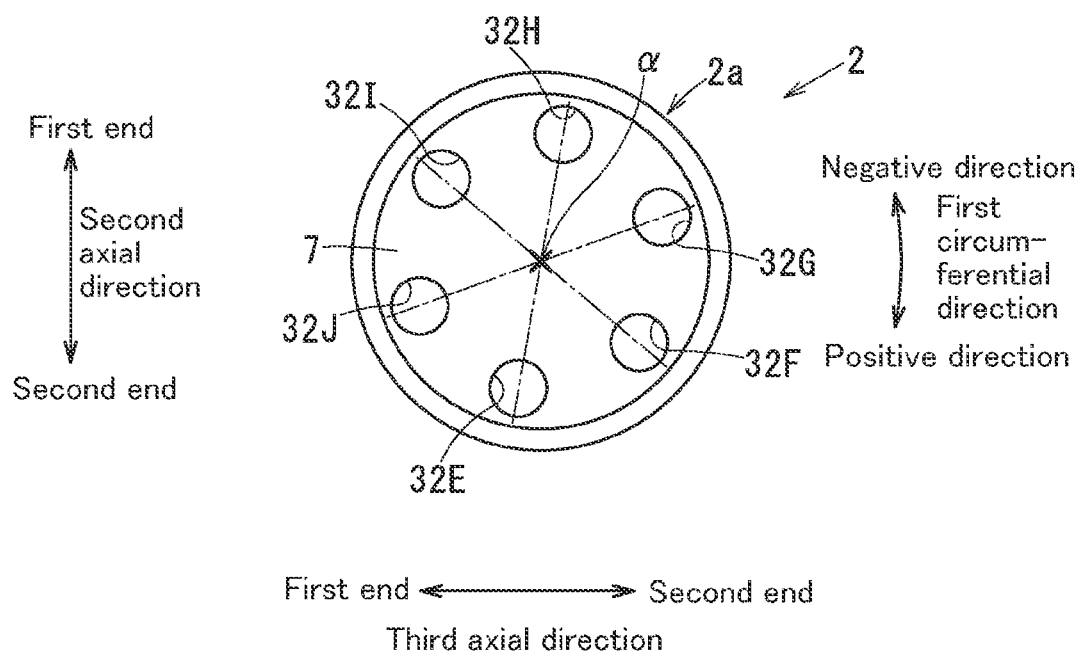
FIG. 24 is a view of the first transmitter as viewed from its first end in the first axial direction when the second rotator is driven to rotate by 10° (second embodiment).
Figure 25:
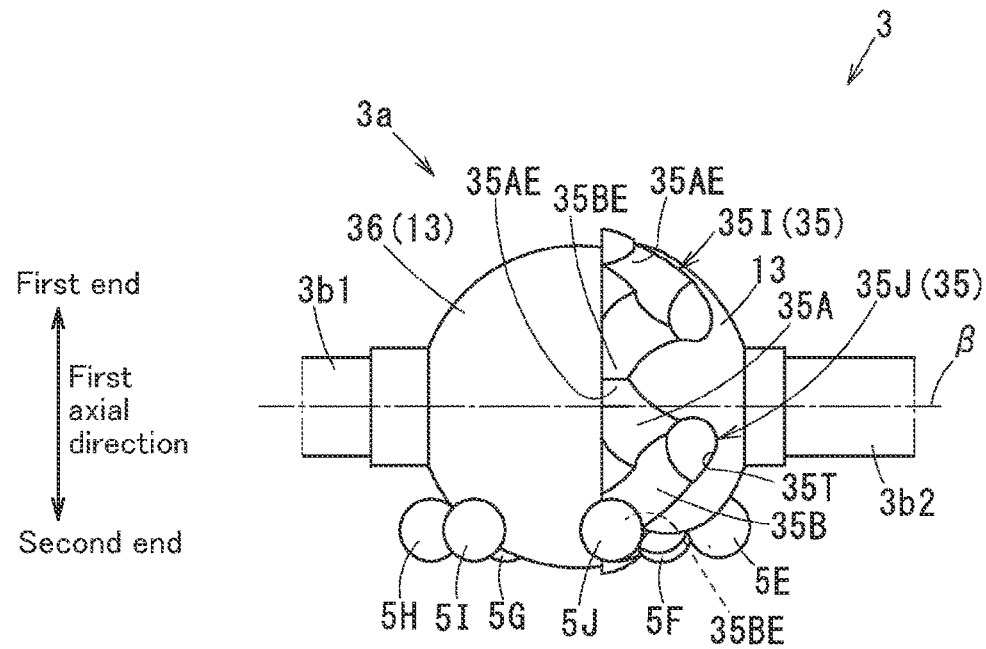
FIG. 25 is a view of the second transmitter and the spheres as viewed from their first ends in the third axial direction when the second rotator is driven to rotate by 10° (second embodiment).
Figure 26:
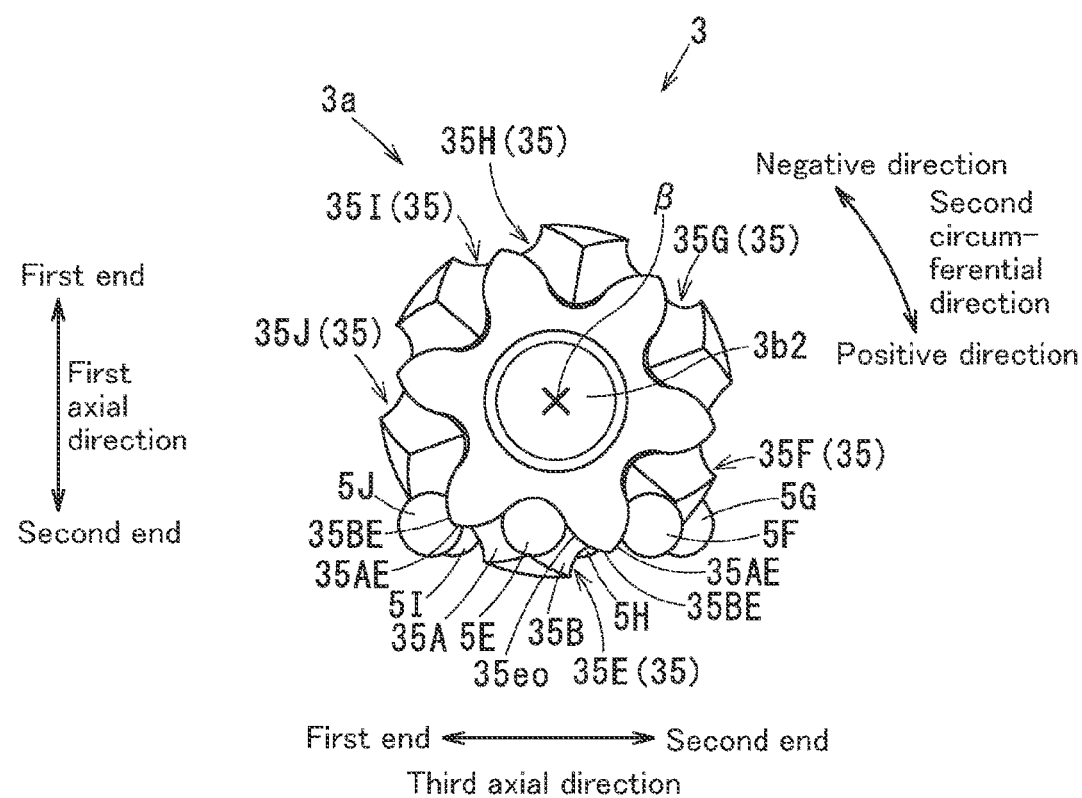
FIG. 26 is a view of the second rotator and the spheres as viewed from their second ends in the second axial direction when the second rotator is driven to rotate by 10° (second embodiment).

In the groove 35, the sphere 5E is located in the bend 35E, the sphere 5F is located in the bend 35F, and the sphere 5J is located in the bend 35J (refer to, for example, FIGS. 19 and 22). More specifically, the sphere 5E is located at the vertex 35T in the bend 35E. The sphere 5F is located at the first end 35AE in the bend 35F. The sphere 5J is located at the second end 35BE in the bend 35J. The other spheres 5G, 5H, and 5I are received in the holes 35G, 35H, and 35I respectively and are pressed and held by the receding surface 36. The concave surface 7 and the convex surface 13 are also out of contact with each other in the driving force transmission device 1 according to the second embodiment.

The above structure causes the first rotator 2 and the second rotator 3 to rotate in the manner described below.

When the first rotator 2 rotates by a predetermined rotation angle in the positive or negative direction, the second rotator 3 also rotates by the same rotation angle in the same direction as the first rotator 2. The first rotator 2 and the second rotator 3 can rotate by 360° or greater in either the positive or negative direction. Further, the spheres 5E, 5F, 5G, 5H, 5I, and 5J as well as the bends 35E, 35F, 35G, 35H, 35I, and 35J repeat the same movements for every 60° rotation.

The groove 35 is located, for example, to cause the spheres 5E, 5F, 5G, 5H, 5I, and 5J to move in the manner described below.

The movements are repeated in the same manner each time the first rotator 2 and the second rotator 3 rotate by 60°. In the example described below, the first rotator 2 and the second rotator 3 rotate from a rotation angle of 0° to 60°.

As described above, the sphere 5E is located at the vertex 35T in the bend 35E when the rotation angle is 0°, or in the reference state. The sphere 5F is located at the first end 35AE in the bend 35F. The sphere 5J is located at the second end 35BE in the bend 35J. The other spheres 5G, 5H, and 5I are received in the holes 35G, 35H, and 35I respectively and are pressed and held by the receding surface 36.

When the first rotator 2 and the second rotator 3 in the reference state rotate to a rotation angle of 60°, the sphere 5E moves from the vertex 35T to the second end 35BE in the second portion 35B in the bend 35E while revolving about the rotation axis α. The sphere 5F moves from the first end 35AE to the vertex 35T in the first portion 35A in the bend 35F while revolving about the rotation axis α.

Further, the sphere 5J moves, for example, from the second end 35BE in the bend 35J at the position with a rotation angle of 10° to be held by the receding surface 36 (refer to, for example, FIGS. 23 to 26). The sphere 5G is freed from the state of being held by the receding surface 36 at the position with a rotation angle of 60° to be received in the bend 35G at the first end 35AE.

Operating Characteristics in Second Embodiment

The operating characteristics of the driving force transmission device 1 according to the second embodiment will now be described with reference to, for example, FIG. 27. The operating characteristics include the same pressure angle as in the first embodiment. Pressure angles θE, θF, θG, θH, θI, and θJ are defined as described below for each of the spheres 5E, 5F, 5G, 5H, 5I, and 5J.

The pressure angle θE of the sphere 5E is defined as an angle formed between the direction normal to an outer opening edge 35eo at the entire opening edge of the bend 35E and the moving direction of the sphere 5E (or the direction in which the sphere 5E revolves about the rotation axis α) under a driving force being transmitted between the outer opening edge 35eo and the sphere 5E. The pressure angle θF of the sphere 5F, the pressure angle θG of the sphere 5G, the pressure angle θH of the sphere 5H, the pressure angle θI of the sphere 5I, and the pressure angle θJ of the sphere 5J are defined in the same manner.

The pressure angles θE, θF, θG, θH, θI, and θJ change as the driving force transmission device 1 according to the second embodiment operates, or specifically the second rotator 3 rotates under an external driving force to rotate the first rotator 2 with the spheres 5E, 5F, 5G, 5H, 5I, and 5J between them. In other words, the second rotator 3 performs an input operation and the first rotator 2 performs an output operation. Such changes in the pressure angles θE, θF, θG, θH, θI, and θJ will now be described.

When the second rotator 3 rotates from a rotation angle of 0° to 60° under an external driving force, the first rotator 2 is driven to rotate from 0° to 60°. In this case, the driving force is transmitted between the outer opening edge 35eo of the second portion 35B and the sphere 5E in the bend 35E to form the pressure angle θE. The bend 35J receives the driving force transmitted between the outer opening edge 35eo of the second portion 35B and the sphere 5J until the sphere 5J moves from the second end 35BE to form the pressure angle θJ.

When the second rotator 3 rotates from a rotation angle of 0° to 60°, the sphere 5F is located in the bend 35F. However, no driving force is transmitted between the outer opening edge 35eo and the sphere 5F, and the pressure angle θE is thus not formed. The other spheres 35G, 35H, and 35I are not located in the groove 35 and do not contribute to the transmission of the driving force. The pressure angles θG, θH, and θI are thus not formed.

More specifically, the pressure angles θE and θJ are set, for example, to change in the manner described below. In response to the second rotator 3 rotating from a rotation angle of 0° to 60°, the pressure angle θE rapidly decreases, for example, from 90°, reaches 22°, which is the lowest degree, at a rotation angle of 21°, and then gradually increases to 34°. The pressure angle θE reaches, for example, below 45° at a rotation angle of 4° during its rapid decrease.

The pressure angle θJ increases, for example, from 34° to 38° when the rotation angle changes from 0° to 10°, where the sphere 5J moves from the second end 35BE in the bend 35J.

The pressure angle θE continuously increases from 34° to 38° until the rotation angle reaches 70° after reaching 60°. The sphere 5E moves from the second end 35BE in the bend 35E to be held by the receding surface 36 while the rotation angle changes from 60° to 70°. During this period, the driving force is transmitted between the outer opening edge 35eo of the second portion 35B and the sphere 5E in the bend 35E, continuously forming the pressure angle θE.

When the second rotator 3 rotates from a rotation angle of 0° to 60° as described above, the driving force is not transmitted between the sphere 5F and the outer opening edge 35eo in the bend 35F, and the pressure angle θF is thus not formed. In response to the rotation angle reaching 60° (or in other words, in response to the sphere 5F reaching the vertex 35T in the bend 35F), the driving force starts acting on the sphere 5F from the outer opening edge 35eo. Thus, the pressure angle θE is to be 90° when the rotation angle reaches 60°.

The above changes in the pressure angles θJ, θE, and θF for the rotation angles from 0° to 60° are similar to the changes in the pressure angles θE, θF, and θG for the rotation angles from 60° to 120°, the changes in the pressure angles θF, θG, and θH for the rotation angles from 120° to 180°, the changes in the pressure angles θG, θH, and θI for the rotation angles from 180° to 240°, the changes in the pressure angles θH, θI, and θJ for the rotation angles from 240° to 300°, and the changes in the pressure angles θI, θJ, and θE for the rotation angles from 300° to 360°. The same applies to the rotation angles of 360° or greater.

As described above, when the second rotator 3 performs the input operation and the first rotator 2 performs the output operation in the driving force transmission device 1 according to the second embodiment, the highly pressurized state defined below occurs throughout the rotation ranges of the first rotator 2 and the second rotator 3. The highly pressurized state is defined as the state in which at least one of the pressure angles θE, θF, θG, θH, θI, and θJ of the spheres 5E, 5F, 5G, 5H, 5I, and 5J held between the concave surface 7 and the convex surface 13 is 45° or less.

More specifically, when the second rotator 3 performs the input operation and the first rotator 2 performs the output operation in the driving force transmission device 1 according to the second embodiment, at least one of the pressure angles θE, θF, θG, θH, θI, and θJ is 45° or less, irrespective of the rotation angles of the first rotator 2 and the second rotator 3.

Figure 27:
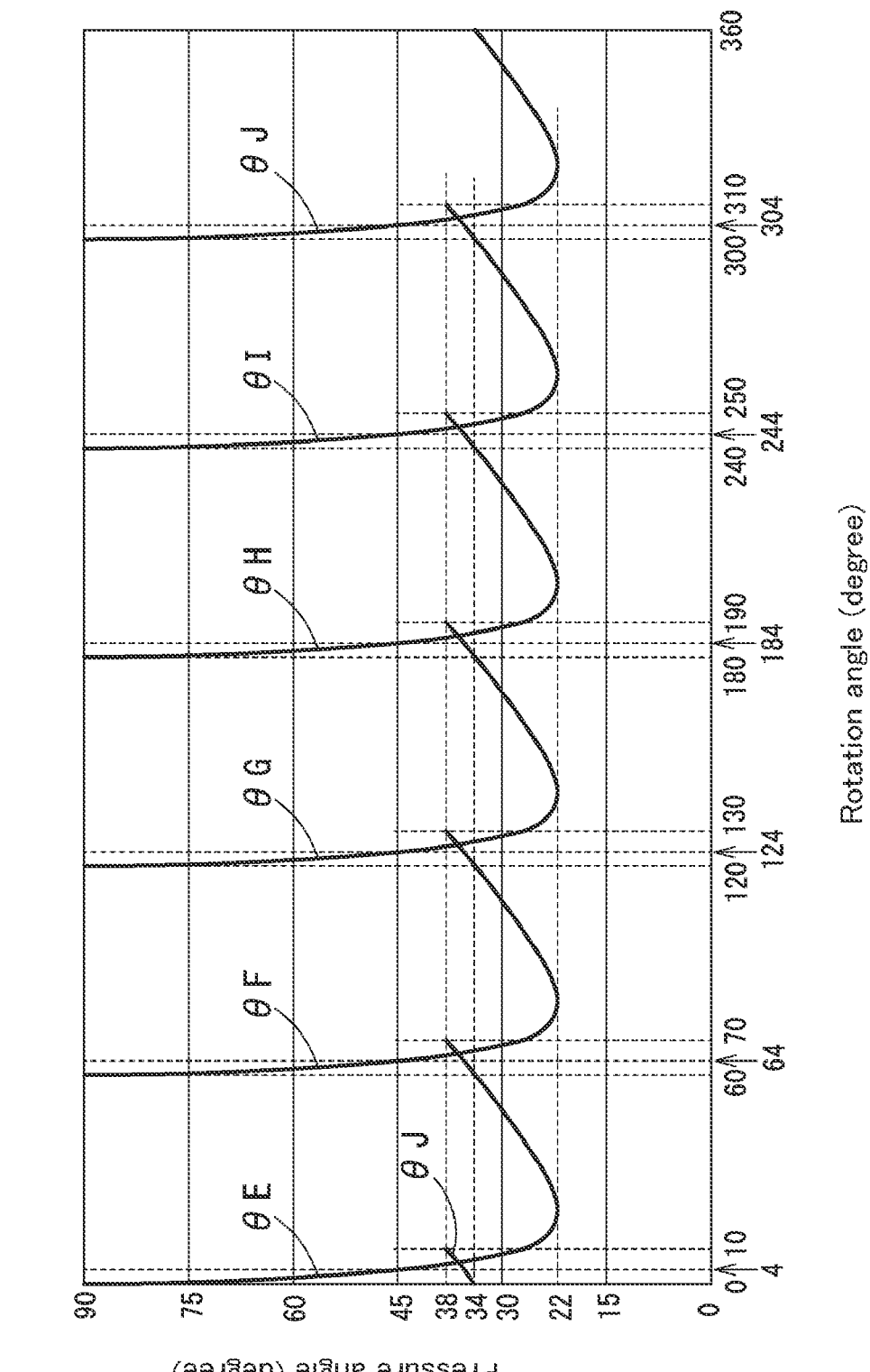
FIG. 27 is a characteristic diagram showing the operating characteristics of the driving force transmission device when the second rotator is driven to rotate in the positive direction (second embodiment).

More specifically, when the second rotator 3 is driven to rotate in the positive second circumferential direction to perform the input operation, one of the pressure angles θE, θF, θG, θH, θI, and θJ is 45° or less, irrespective of the rotation angles of the first rotator 2 and the second rotator 3 (refer to FIG. 27). In other words, when the second rotator 3 is driven to rotate in the positive second circumferential direction to perform the input operation, one of the states below holds.

More specifically, at least one of the spheres 5E, 5F, 5G, 5H, 5I, and 5J is in contact with the portion of the outer opening edge 35eo defining the vertex 35T and the second portion 35B in the respective bends 35E, 35F, 35G, 35H, 35I, and 35J to form a pressure angle of 45° or less.

For the range from a rotation angle of 0° to 60°, the pressure angle θJ is 45° or less in the range from a rotation angle of 0° to 4°, the pressure angles θJ and θE are both 45° or less in the range from a rotation angle of 4° to 10°, and the pressure angle θE is 45° or less in the range from a rotation angle of 10° to 60°. The pressure angles θE and θF show the same trends in the range from a rotation angle of 60° to 120°, the pressure angles θF and θG show the same trends in the range from a rotation angle of 120° to 180°, the pressure angles θG and θH show the same trends in the range from a rotation angle of 180° to 240°, the pressure angles θH and θI show the same trends in the range from a rotation angle of 240° to 300°, and the pressure angles θI and θJ show the same trends in the range from a rotation angle of 300° to 360° (refer to FIG. 27).

When the second rotator 3 is driven to rotate in the negative second circumferential direction as well, the highly pressurized state also occurs throughout the rotation ranges of the first rotator 2 and the second rotator 3, which will not be described. Further, when the first rotator 2 performs the input operation and the second rotator 3 performs the output operation as well, the highly pressurized state also occurs throughout the rotation ranges of the first rotator 2 and the second rotator 3, irrespective of whether the first rotator 2 is driven to rotate in the positive first circumferential direction or in the negative first circumferential direction, which will not be described.

Operations in Second Embodiment

In the driving force transmission device 1 according to the second embodiment, the holes 32E, 32F, 32G, 32H, 32I, and 32J in the first rotator 2 and the groove 35 in the second rotator 3 are located to create the highly pressurized state throughout the rotation ranges of the first rotator 2 and the second rotator 3. More specifically, at least one of the pressure angle θE of the sphere 5E, the pressure angle θF of the sphere 5F, the pressure angle θG of the sphere 5G, the pressure angle θH of the sphere 5H, the pressure angle θI of the sphere 5I, and the pressure angle θJ of the sphere 5J is 45° or less throughout the rotation ranges of the first rotator 2 and the second rotator 3. This reliably places the first rotator 2 under a driving force in the first circumferential direction and the second rotator 3 under a driving force in the second circumferential direction, thus causing the first rotator 2 and the second rotator 3 to rotate.

For example, when the second rotator 3 is driven to rotate in the positive second circumferential direction to perform the input operation, the pressure angle θE is 45° or less in the range from a rotation angle of 10° to 60° as described above. In other words, the sphere 5E is in contact with the portion of the outer opening edge 35eo in the bend 35E defining the vertex 35T and the second portion 35B to form the pressure angle θE of 45° or less. This reliably generates a force component that acts on the sphere 5E in the first circumferential direction from the outer opening edge 35eo in the bend 35E in the range from a rotation angle of 10° to 60°.

In the range for the other rotation angles as well, at least one of the pressure angles θE, θF, θG, θH, θI, and θJ is 45° or less, thus reliably generating a force component that acts on at least one of the spheres 5E, 5F, 5G, 5H, 5I, and 5J in the first circumferential direction.

This reliably rotates the first rotator 2 in the first circumferential direction to perform the output operation.

Further, the pressure angle θE being 45° or less in the range from a rotation angle of 10° to 60° allows the force component acting on the sphere 5E in the first circumferential direction to be greater than a force component acting in the first axial direction and a force component acting in a radial direction perpendicular to the first axial direction and the first circumferential direction.

In the range for the other rotation angles as well, at least one of the pressure angles θE, θF, θG, θH, θI, and θJ being 45° or less allows the force component acting on at least one of the spheres 5E, 5F, 5G, 5H, 5I, and 5J in the first circumferential direction to be greater than a force component acting in the first axial direction and a component force acting in the radial direction.

The driving force is thus used more efficiently to rotate the first rotator 2 and the second rotator 3.

In the driving force transmission device 1 according to the second embodiment, the bends 35E, 35F, 35G, 35H, 35I, and 35J included in the groove 35 in the second rotator 3 are continuous with one another in the second circumferential direction, defining the circumference about the rotation axis β.

This allows the first rotator 2 and the second rotator 3 to continue to rotate in the same direction for rotation angles greater than 360°.

Further, in the driving force transmission device 1 according to the second embodiment, the convex surface 13 includes the receding surface 36, which recedes by the depth of the groove 35, located in an area toward the first end of the second rotator 3 from the predetermined position in the second axial direction. The bends 35E, 35F, 35G, 35H, 35I, and 35J are located in an area toward the second end of the second rotator 3 from the predetermined position in the second axial direction. Each of the bends 35E, 35F, 35G, 35H, 35I, and 35J has the first end 35AE and the second end 35BE connected to the receding surface 36.

This structure includes no portion in the groove 35 that does not contribute to the transmission of a driving force between the spheres 5E, 5F, 5G, 5H, 5I, and 5J and the second rotator 3, thus reducing the production costs.

Modifications

The present invention may be modified variously without departing from the spirit and scope of the invention.

For example, the driving force transmission device 1 according to the first embodiment includes the three holes 32A, 32B, and 32C and the two grooves 29 and 30, and the driving force transmission device 1 according to the second embodiment includes the six holes 32E, 32F, 32G, 32H, 32I, and 32J and the single groove 35, but the driving force transmission device 1 may include any number of holes or grooves. In some embodiments, the driving force transmission device 1 may include four or five holes, or six or more holes. The driving force transmission device 1 may include three or more grooves.

In the driving force transmission device 1 according to the first embodiment, the grooves 29 and 30 each include a single bend. In the driving force transmission device 1 according to the second embodiment, the groove 35 includes the six bends 35E, 35F, 35G, 35H, 35I, and 35J. In some embodiments, a single groove may include any number of bends. In some embodiments, a single groove may include two to five bends, or six or more bends.

Figure 28:
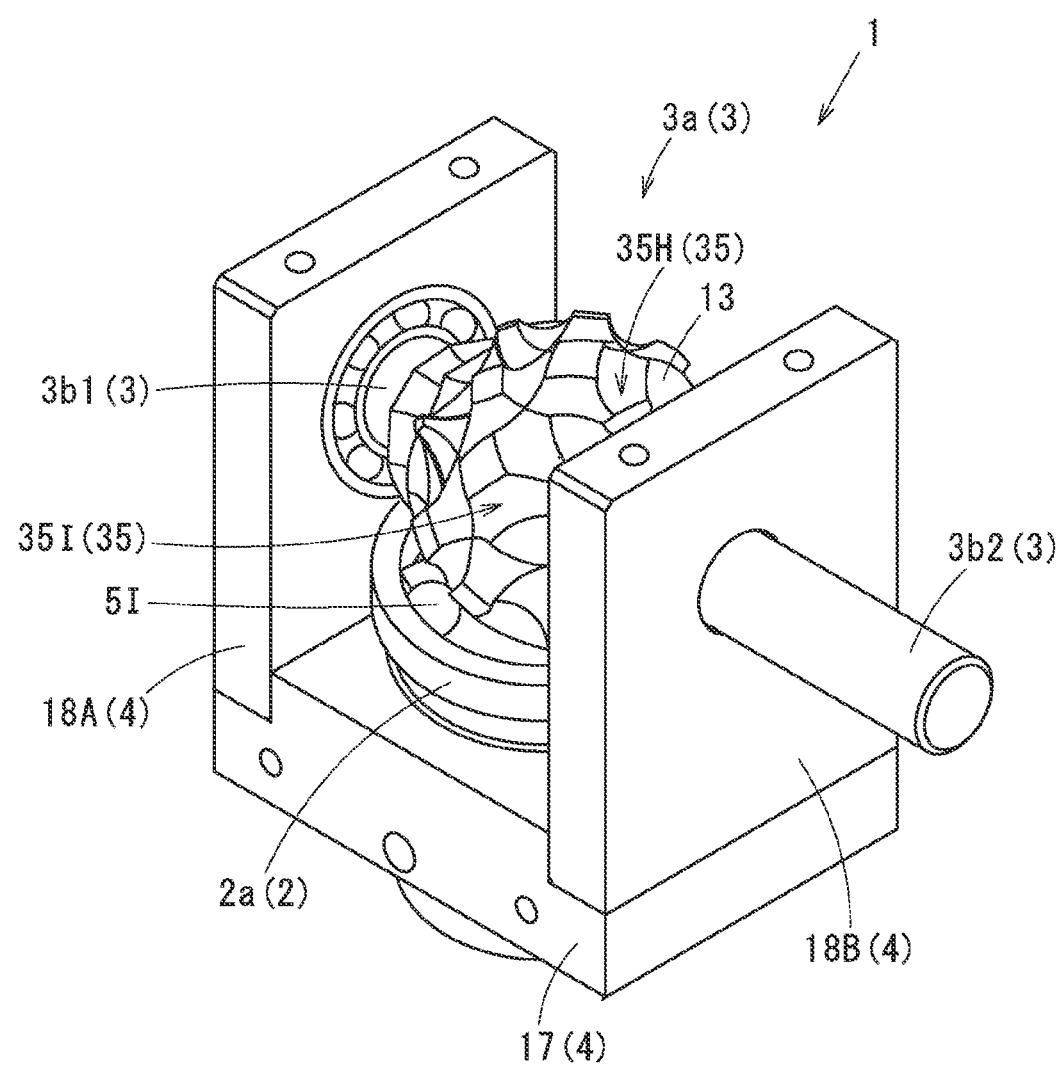
FIG. 28 is a perspective view of a driving force transmission device (modification).
Figure 29:
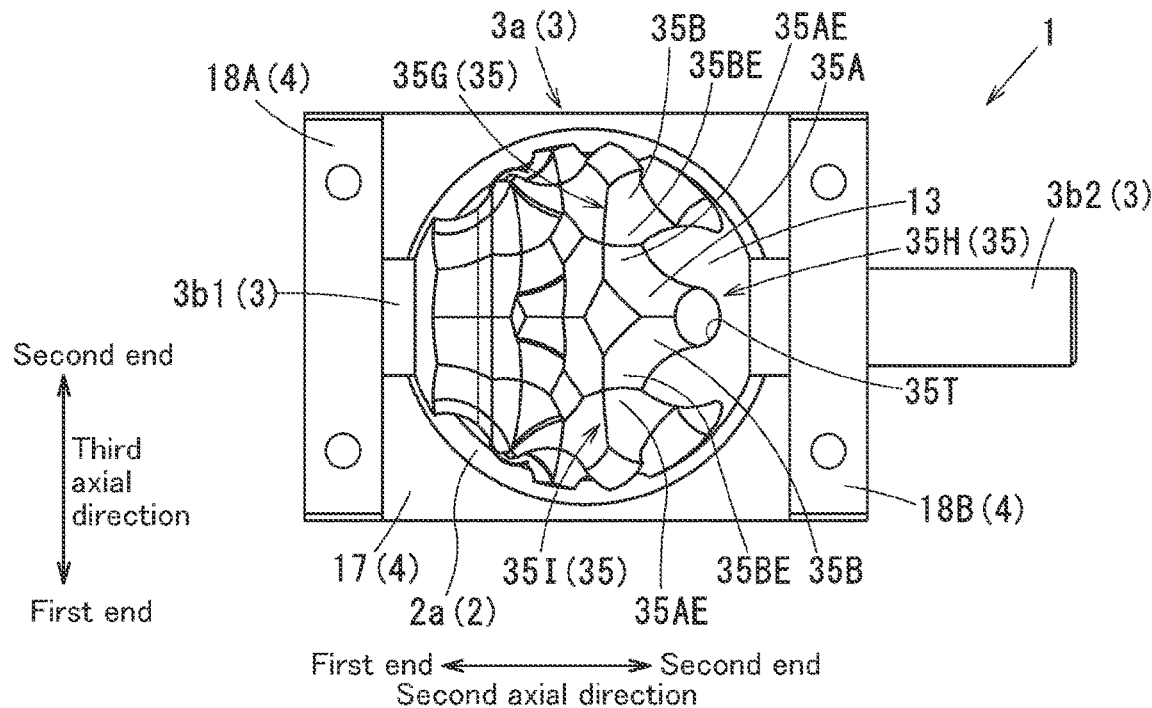
FIG. 29 is a plan view of a driving force transmission device (modification).
Figure 30:
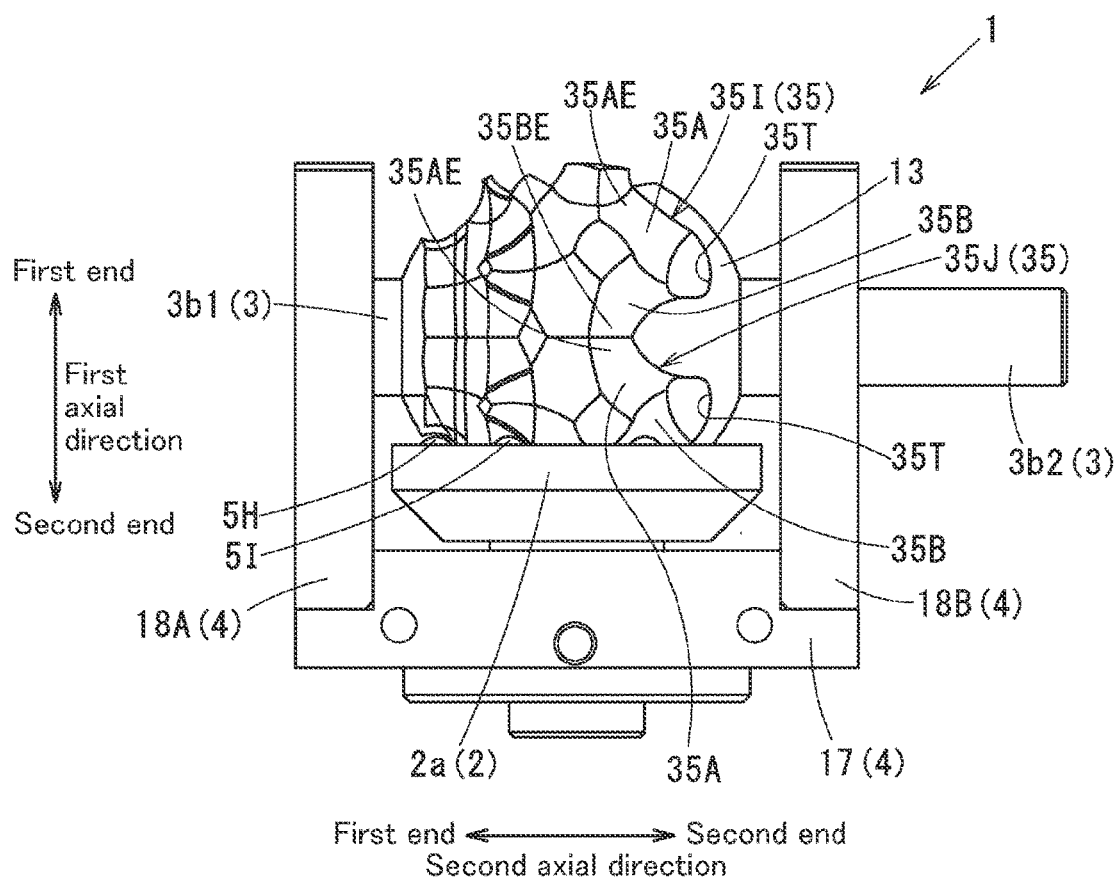
FIG. 30 is a side view of the driving force transmission device as viewed from its first end in the third axial direction (modification).

In the driving force transmission device 1 according to the second embodiment, the convex surface 13 includes the receding surface 36 located in an area toward the first end of the second rotator 3 from a predetermined position in the second axial direction, but the receding surface 36 may be eliminated. In the structure shown in FIGS. 28 to 30 without the receding surface 36, for example, the first portion 35A and the second portion 35B in each of the bends 35E, 35F, 35G, 35H, 35I, and 35J may be extended, and the first portion 35A and the second portion 35B in different bends may cross each other.

Further, in the driving force transmission device 1 according to the first embodiment or the second embodiment, the concave surface 7 and the convex surface 13 are both spherical surfaces, but the concave surface 7 and the convex surface 13 may be in any other shape. More specifically, the above effects can be produced when the concave surface 7 and the convex surface 13 are out of contact with each other and the spheres in contact with the grooves and the holes allow rotation of the first rotator 2 and the second rotator 3. Thus, for example, the concave surface 7 and the convex surface 13 may be in any shape other than a spherical surface such as a cone surface and an outer surface of a polyhedron.

REFERENCE SIGNS LIST 1 driving force transmission device
2 first rotator
3 second rotator
5A, 5B, 5C, 5E, 5F, 5G, 5H, 5I, 5J sphere
7 concave surface
13 convex surface
29, 30, 35 groove
32A, 32B, 32C, 32E, 32F, 32G, 32H, 32I, 32J hole
35E, 35F, 35G, 35H, 35I, 35J bend
29T, 30T, 35T vertex
29A, 30A, 35A first portion (side)
29B, 30B, 35B second portion (side)
29eo, 30eo, 35eo outer opening edge

The invention claimed is:

1. A driving force transmission device for transmitting a driving force, the device comprising:
a first rotator configured to perform one of an input operation and an output operation of a driving force, the first rotator including a concave surface;
a second rotator configured to perform the other of the input operation and the output operation of the driving force, the second rotator including a convex surface fitted into the concave surface; and
a plurality of spheres between the concave surface and the convex surface,
wherein the concave surface has a plurality of holes in which the respective plurality of spheres are received,
the convex surface has a groove configured to receive parts of the plurality of spheres protruding from the plurality of holes,
the groove includes at least one bend having a vertex and two sides, and the two sides extend in a portion of the second rotator located toward a first end of the second rotator in an axial direction of the second rotator,
in response to the first rotator or the second rotator being driven to rotate under an external driving force, the plurality of spheres received in the plurality of holes revolve about a rotation axis of the first rotator and move along the groove between the concave surface and the convex surface being out of contact with each other, and
the plurality of holes and the groove are located to create a pressurized state throughout a rotation range of each of the first rotator and the second rotator, where the pressurized state is a state in which at least one of the plurality of spheres has a pressure angle of 60° or less, and the pressure angle is an angle between a direction normal to an outer opening edge of the at least one bend and a moving direction of each of the plurality of spheres under a driving force transmitted between the outer opening edge and each of the plurality of spheres.

2. The driving force transmission device according to claim 1, wherein
the plurality of holes and the groove are located to create a highly pressurized state throughout the rotation range of each of the first rotator and the second rotator, where the highly pressurized state is a state in which at least one of the plurality of spheres has a pressure angle of 45° or less.

3. The driving force transmission device according to claim 1, wherein the at least one bend includes a plurality of bends continuous with one another in a circumferential direction of the second rotator, and the plurality of bends define a circumference about a rotation axis of the second rotator.

4. The driving force transmission device according to claim 3, wherein
the convex surface includes a receding surface located in an area toward the first end of the second rotator from a predetermined position in the axial direction of the second rotator, and the receding surface recedes by a depth of the groove,
the plurality of bends are located in an area toward a second end of the second rotator from the predetermined position in the axial direction of the second rotator, and
each of the two sides has a first end in the axial direction of the second rotator connected to the receding surface.

5. The driving force transmission device according to claim 1, wherein
the plurality of spheres between the concave surface and the convex surface include three or more spheres.

6. The driving force transmission device according to claim 1, wherein
the concave surface and the convex surface are spherical surfaces.

7. A robot hand, comprising:
a driving force transmission device for transmitting a driving force; and
an arm;
the driving force transmission device comprising:
a first rotator configured to perform one of an input operation and an output operation of a driving force, the first rotator including a concave surface;
a second rotator configured to perform the other of the input operation and the output operation of the driving force, the second rotator including a convex surface fitted into the concave surface; and
a plurality of spheres between the concave surface and the convex surface,
wherein the concave surface has a plurality of holes in which the respective plurality of spheres are received,
the convex surface has a groove configured to receive parts of the plurality of spheres protruding from the plurality of holes,
the groove includes at least one bend having a vertex and two sides, and the two sides extend in a portion of the second rotator located toward a first end of the second rotator in an axial direction of the second rotator,
in response to the first rotator or the second rotator being driven to rotate under an external driving force, the plurality of spheres received in the plurality of holes revolve about a rotation axis of the first rotator and move along the groove between the concave surface and the convex surface being out of contact with each other,
the plurality of holes and the groove are located to create a pressurized state throughout a rotation range of each of the first rotator and the second rotator, where the pressurized state is a state in which at least one of the plurality of spheres has a pressure angle of 60° or less, and the pressure angle is an angle between a direction normal to an outer opening edge of the at least one bend and a moving direction of each of the plurality of spheres under a driving force transmitted between the outer opening edge and each of the plurality of spheres, and
the arm is integral with one of the first rotator and the second rotator, and driven to rotate under a driving force transmitted from the driving force transmission device.

8. The robot hand according to claim 7, wherein
the plurality of holes and the groove are located to create a highly pressurized state throughout the rotation range of each of the first rotator and the second rotator, where the highly pressurized state is a state in which at least one of the plurality of spheres has a pressure angle of 45° or less.

9. The robot hand according to claim 7, wherein
the at least one bend includes a plurality of bends continuous with one another in a circumferential direction of the second rotator, and the plurality of bends define a circumference about a rotation axis of the second rotator.

10. The robot hand according to claim 9, wherein
the convex surface includes a receding surface located in an area toward the first end of the second rotator from a predetermined position in the axial direction of the second rotator, and the receding surface recedes by a depth of the groove,
the plurality of bends are located in an area toward a second end of the second rotator from the predetermined position in the axial direction of the second rotator, and
each of the two sides has a first end in the axial direction of the second rotator connected to the receding surface.

11. The robot hand according to claim 7, wherein
the plurality of spheres between the concave surface and the convex surface include three or more spheres.

12. The robot hand according to claim 7, wherein
the concave surface and the convex surface are spherical surfaces.

* * * * *